US012754630B2

(12) United States Patent
Park et al.

(10) Patent No.: US 12,754,630 B2
(45) Date of Patent: *Oct. 6, 2026

(54) ELECTRONIC DEVICE

(71) Applicant: SAMSUNG DISPLAY CO., LTD., Yongin-si (KR)

(72) Inventors: So-Young Park, Yongin-si (KR); Soongyu Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,174

(22) Filed: Dec. 30, 2024

(65) Prior Publication Data

US 2025/0130662 A1 Apr. 24, 2025

Related U.S. Application Data

(63) Continuation of application No. 18/481,425, filed on Oct. 5, 2023, now Pat. No. 12,210,702.

(30) Foreign Application Priority Data

Nov. 24, 2022 (KR) ........................ 10-2022-0159727

(51) Int. Cl.
*G06F 3/041* (2006.01)
*G06F 3/044* (2006.01)

(52) U.S. Cl.
CPC .......... *G06F 3/0416* (2013.01); *G06F 3/0443* (2019.05)

(58) Field of Classification Search
CPC ............................. G06F 3/0416; G06F 3/0443
See application file for complete search history.

(56) References Cited

U.S. PATENT DOCUMENTS 8,144,126 B2 3/2012 Wright
11,195,447 B2 * 12/2021 Choi .................. H04W 52/027
(Continued)

FOREIGN PATENT DOCUMENTS

KR 10-1362843 2/2014
KR 10-2014-0106775 9/2014
(Continued)

OTHER PUBLICATIONS

Notice of Allowance dated Sep. 24, 2024 in corresponding U.S. Appl. No. 18/481,425.

*Primary Examiner* — Ke Xiao
*Assistant Examiner* — Jennifer L Zubajlo
(74) *Attorney, Agent, or Firm* — F. CHAU & ASSOCIATES, LLC

(57) ABSTRACT

An electronic device includes a display layer that displays an image during a plurality of frame periods, a sensor layer, a sensor driving unit, and a main driving unit. When a user makes a call, the sensor driving unit switches from a first mode to a second mode and drives the sensor layer. When the sensor layer senses a large-area conductor in the second mode, the sensor driving unit switches from the second mode to a third mode and drives the sensor layer. When the main driving unit determines a proximity state in the third mode, the sensor driving unit switches from the third mode to the second mode and drives the sensor layer. When the sensor layer senses a touch in the second mode, the sensor driving unit switches from the second mode to a fourth mode and drives the sensor layer.

20 Claims, 21 Drawing Sheets

(56) References Cited

U.S. PATENT DOCUMENTS

| | | | | |
|---|---|---|---|---|
| 11,216,115 | B2 * | 1/2022 | Lee | G06F 3/041662 |
| 11,353,992 | B2 * | 6/2022 | Kwak | G06F 3/04186 |
| 11,467,688 | B2 * | 10/2022 | Lee | G06F 3/0416 |
| 11,670,242 | B2 | 6/2023 | Cho et al. | |
| 2014/0240259 | A1 | 8/2014 | Park et al. | |
| 2016/0048234 | A1 * | 2/2016 | Chandran | G06F 3/0442 345/174 |
| 2021/0247874 | A1 * | 8/2021 | Ko | G06F 3/0412 |
| 2021/0389839 | A1 * | 12/2021 | Kwak | G06F 3/14 |
| 2022/0107703 | A1 * | 4/2022 | Lee | G06F 3/0416 |
| 2022/0121314 | A1 * | 4/2022 | Kim | G09G 3/2096 |
| 2022/0244829 | A1 * | 8/2022 | Lee | G06F 3/0412 |
| 2022/0344409 | A1 * | 10/2022 | Lee | G09G 3/3233 |
| 2022/0374147 | A1 * | 11/2022 | Ko | G06F 3/041662 |
| 2022/0404944 | A1 * | 12/2022 | Lee | G06F 3/0412 |
| 2022/0404946 | A1 * | 12/2022 | Lee | G06F 3/04166 |
| 2023/0043817 | A1 * | 2/2023 | Lee | G06F 3/04166 |
| 2023/0094019 | A1 * | 3/2023 | Lee | G06F 3/04166 345/173 |
| 2023/0236695 | A1 * | 7/2023 | Lee | G06F 3/0446 345/174 |
| 2024/0169930 | A1 * | 5/2024 | Park | G09G 3/3275 |
| 2024/0176442 | A1 | 5/2024 | Park et al. | |
| 2024/0176447 | A1 * | 5/2024 | Park | G06F 3/0445 |
| 2024/0252510 | A1 * | 8/2024 | Park | A61K 31/55 |

FOREIGN PATENT DOCUMENTS

| | | | |
|---|---|---|---|
| KR | 10-2020-0017736 | | 2/2020 |
| KR | 10-2020-0027134 | | 3/2020 |
| KR | 10-2020-0099043 | | 8/2020 |
| KR | 10-2022-0045586 | A | 4/2022 |
| KR | 10-2022-0046748 | | 4/2022 |
| KR | 10-2022-0111818 | A | 8/2022 |
| KR | 10-2022-0147179 | A | 11/2022 |

* cited by examiner

ELECTRONIC DEVICE

CROSS-REFERENCE TO RELATED APPLICATIONS

This application is a continuation of U.S. patent application Ser. No. 18/481,425 filed on Oct. 5, 2023, which claims priority under 35 U.S.C. § 119 to Korean Patent Application No. 10-2022-0159727 filed on Nov. 24, 2022, the disclosure of which is incorporated by reference herein in its entirety.

TECHNICAL FIELD

Embodiments of the present disclosure relate to an electronic device in which power consumption may be reduced and in which sensing reliability may be increased.

DISCUSSION OF RELATED ART

Multimedia electronic devices such as, for example, a television, a mobile phone, a tablet computer, a navigation system, and a game console include an electronic device that displays an image. In addition to a general input device such as a button, a keyboard, or a mouse, an electronic device may include an input sensor capable of receiving a touch-based input that allows a user to enter information or commands easily and intuitively.

SUMMARY

Embodiments of the present disclosure provide an electronic device in which power consumption may be reduced and the reliability of sensing may be increased.

According to an embodiment, an electronic device may include a display layer that displays an image during a plurality of frame periods, a display driving unit that drives the display layer in a first display mode and a second display mode different from the first display mode, a sensor layer that is disposed on the display layer and includes a plurality of first electrodes and a plurality of second electrodes, a sensor driving unit that drives the sensor layer in a first mode, a second mode different from the first mode, a third mode different from the first mode and the second mode, and a fourth mode different from the first mode, the second mode, and the third mode, and a main driving unit that controls an operation of the display driving unit and an operation of the sensor driving unit. When a user makes a call, the sensor driving unit may switch from the first mode to the second mode and may drive the sensor layer. In the second mode, one frame period among the plurality of frame periods may include a first touch section in which a touch of the user is sensed in a mutual touch method, a first proximity sensing section of sensing a proximity state of a large-area conductor, and a second touch section in which the touch is sensed in a self-touch method. When the sensor layer senses the large-area conductor in the second mode, the sensor driving unit may switch from the second mode to the third mode and may drive the sensor layer. When the main driving unit determines the proximity state in the third mode, the sensor driving unit may switch from the third mode to the second mode and may drive the sensor layer. When the sensor layer senses the touch in the second mode, the sensor driving unit may switch from the second mode to the fourth mode and may drive the sensor layer. In the fourth mode, one frame period among the plurality of frame periods may include the first touch section provided in plurality, a second proximity sensing section shorter than the first proximity sensing section, and the second touch section provided in plurality.

In the second mode, the sensor driving unit may provide the main driving unit with a first proximity sensing signal sensed in the first proximity sensing section, and the main driving unit may provide the sensor driving unit with a first proximity determination signal generated based on the first proximity sensing signal. In the third mode, one frame period among the plurality of frame periods may include the first proximity sensing section. In the third mode, the sensor driving unit may provide the main driving unit with a second proximity sensing signal sensed in the second proximity sensing section, and the main driving unit does not provide the sensor driving unit with a second proximity determination signal generated based on the second proximity sensing signal.

In the third mode, a first frame period and a second frame period among the plurality of frame periods may be repeated, the first frame period may include the first proximity sensing section and the second touch section, and the second frame period may include the first touch section and the first proximity sensing section.

In the third mode, a first frame period and a second frame period among the plurality of frame periods may be repeated, the first frame period may include the first touch section and a third proximity sensing section whose frequency is shorter than a frequency of the first proximity sensing section, and the second frame period may include the first touch section, the first proximity sensing section, and the second touch section.

In the third mode, at least one frame period among the plurality of frame periods may include a third touch section in which the touch is sensed by transmitting a first sensing signal to each of first electrodes not overlapping the large-area conductor from among the plurality of first electrodes, the first proximity sensing section, and the second touch section.

In the second mode, the sensor driving unit may receive a sensing signal from each of the plurality of second electrodes and may determine the touch. In the third mode, the sensor driving unit may determine the touch only by using the sensing signal received from at least one second electrode not overlapping the large-area conductor from among the plurality of second electrodes.

The display driving unit may drive the display layer in the second display mode during the third mode, and in the second display mode, a luminance of the display layer may gradually decrease during the plurality of frame periods.

In the third mode, at least one frame period among the plurality of frame periods may be a blank period.

The sensor driving unit may further drive the sensor layer in a first sub-mode and a second sub-mode. When the touch is sensed for at least a predetermined time in the fourth mode, the sensor driving unit may operate in the first sub-mode. When the touch is sensed during a time shorter than the predetermined time in the fourth mode, the sensor driving unit may operate in the second sub-mode.

The main driving unit may ignore the touch while the sensor driving unit operates in the first sub-mode.

The electronic device may further include a gesture sensor that senses a first sensing value, and an infrared sensor that senses a second sensing value, the sensor layer may sense a third sensing value, a weight applied to each of the first sensing value and the second sensing value in the first sub-mode may be greater than a weight applied to each of the first sensing value and the second sensing value in the second sub-mode, and a weight applied to the third sensing value in the first sub-mode may be smaller than a weight applied to the third sensing value in the second sub-mode.

The display driving unit may drive the display layer in the second display mode during the first sub-mode, and in the second display mode, a luminance of the display layer may gradually decrease during the plurality of frame periods.

In the first sub-mode, one frame period among the plurality of frame periods may include the first touch section, the first proximity sensing section, and the second touch section.

In the second sub-mode, the sensor driving unit may determine coordinates of the touch based on the plurality of first touch sections and the plurality of second touch sections in the fourth mode.

The display driving unit may further operate in a third display mode which is different from the first display mode and the second display mode and in which the display layer is turned off. When the main driving unit determines the proximity state, the display driving unit may drive the display layer in the third display mode.

According to an embodiment, an electronic device may include a display layer that displays an image during a plurality of frame periods, a display driving unit that drives the display layer, a sensor layer that is disposed on the display layer, a sensor driving unit that drives the sensor layer in a first mode, a second mode different from the first mode, and a third mode different from the first mode and the second mode, and a main driving unit that controls an operation of the display driving unit and an operation of the sensor driving unit. When a user makes a call, the sensor driving unit may switch from the first mode to the second mode and may drive the sensor layer. In the second mode, one frame period among the plurality of frame periods may include a first touch section in which a touch of the user is sensed in a mutual touch method, a first proximity sensing section in which a proximity state of a large-area conductor is sensed, and a second touch section in which the touch is sensed in a self-touch method. When the sensor layer senses an external input in the second mode, the sensor driving unit may switch from the second mode to the third mode and may drive the sensor layer. In the third mode, one frame period among the plurality of frame periods may include a second proximity sensing section different the first proximity sensing section, and the first touch section or the second touch section. When the main driving unit determines the proximity state in the third mode, the sensor driving unit may switch from the third mode to the second mode and may drive the sensor layer.

In the second mode, the sensor driving unit may provide the main driving unit with a first proximity sensing signal sensed in the first proximity sensing section, and the main driving unit may provide the sensor driving unit with a first proximity determination signal generated based on the first proximity sensing signal. In the third mode, the sensor driving unit may provide the main driving unit with a second proximity sensing signal sensed in the second proximity sensing section, and the main driving unit does not provide the sensor driving unit with a second proximity determination signal generated based on the second proximity sensing signal.

A period of the second proximity sensing section may be longer than a period of the first proximity sensing section, and a frequency of the second proximity sensing section may be shorter than a frequency of the first proximity sensing section.

In the second mode, the sensor driving unit may receive a second sensing signal from each of the plurality of second electrodes and may determine the touch. In the third mode, the sensor driving unit may determine the touch only by using the second sensing signal received from at least one second electrode not overlapping the large-area conductor from among the plurality of second electrodes.

The display driving unit may drive the display layer in a first display mode during the third mode, and in the first display mode, a luminance of the display layer may gradually decrease during the plurality of frame periods.

In the third mode, another frame period among the plurality of frame periods may be provided after the one frame period and may be a blank period.

The sensor driving unit may further drive the sensor layer in a fourth mode, a first sub-mode, and a second sub-mode. When the sensor layer senses the touch, the sensor driving unit may drive the sensor layer in the fourth mode. In the fourth mode, one frame period among the plurality of frame periods may include the first touch section provided in a plurality, a second proximity sensing section shorter than the first proximity sensing section, and the second touch section provided in a plurality. When the touch is sensed for at least a predetermined time in the fourth mode, the sensor driving unit may operate in the first sub-mode. When the touch is sensed during a time shorter than the predetermined time in the fourth mode, the sensor driving unit may operate in the second sub-mode.

The main driving unit may ignore the touch while the sensor driving unit operates in the first sub-mode.

The electronic device may further include a gesture sensor that senses a first sensing value, and an infrared sensor that senses a second sensing value, the sensor layer may sense a third sensing value, a weight applied to each of the first sensing value and the second sensing value in the first sub-mode may be greater than a weight applied to each of the first sensing value and the second sensing value in the second sub-mode, and a weight applied to the third sensing value in the first sub-mode may be smaller than a weight applied to the third sensing value in the second sub-mode.

According to an embodiment, an electronic device may include a display layer that displays an image during a plurality of frame periods, a display driving unit that drives the display layer, a gesture sensor that senses a first sensing value, an infrared sensor that senses a second sensing value, a sensor layer that is disposed on the display layer and senses a third sensing value, a sensor driving unit that drives the sensor layer in a first mode, a second mode different from the first mode, a third mode different from the first mode and the second mode, a first sub-mode, and a second sub-mode, and a main driving unit that controls an operation of the display driving unit and an operation of the sensor driving unit. When a user makes a call, the sensor driving unit may switch from the first mode to the second mode and may drive the sensor layer. In the second mode, one frame period among the plurality of frame periods may include a first touch section of in which a touch of the user is sensed in a mutual touch method, a first proximity sensing section in which a proximity state of a large-area conductor is sensed, and a second touch section in which the touch is sensed in a self-touch method. When the sensor layer senses an external input in the second mode, the sensor driving unit may switch from the second mode to the third mode and may drive the sensor layer. In the third mode, one frame period among the plurality of frame periods may include the first touch section provided in a plurality, a second proximity sensing section shorter than the first proximity sensing section, and the second touch section provided in a plurality. When the touch is sensed for at least a predetermined time in the third mode, the sensor driving unit may operate in the first sub-mode. When the touch is sensed during a time shorter than the predetermined time in the fourth mode, the sensor driving unit may operate in the second sub-mode. A weight applied to each of the first sensing value and the second sensing value in the first sub-mode may be greater than a weight applied to each of the first sensing value and the second sensing value in the second sub-mode, and a weight applied to the third sensing value in the first sub-mode may be smaller than a weight applied to the third sensing value in the second sub-mode.

The main driving unit may ignore the touch while the sensor driving unit operates in the first sub-mode.

The display driving unit may drive the display layer in a first display mode during the first sub-mode, and in the first display mode, a luminance of the display layer may gradually decrease during the plurality of frame periods.

The sensor driving unit may further operate in a fourth mode. When the sensor layer senses the proximity state in the second mode, the sensor driving unit may switch from the second mode to the fourth mode and may drive the sensor layer. In the fourth mode, one frame period among the plurality of frame periods may include a third proximity sensing section different from the first proximity sensing section, and the first touch section or the second touch section.

In the second mode, the sensor driving unit may provide the main driving unit with a first proximity sensing signal sensed in the first proximity sensing section, and the main driving unit may provide the sensor driving unit with a first proximity determination signal generated based on the first proximity sensing signal. In the fourth mode, the sensor driving unit may provide the main driving unit with a third proximity sensing signal sensed in the third proximity sensing section, and the main driving unit does not provide the sensor driving unit with a third proximity determination signal generated based on the third proximity sensing signal.

A period of the third proximity sensing section may be longer than a period of the first proximity sensing section, and a frequency of the third proximity sensing section may be shorter than a frequency of the first proximity sensing section.

In the second mode, the sensor driving unit may receive a sensing signal from each of the plurality of second electrodes and may determine the touch. In the third mode, the sensor driving unit may determine the touch only by using the sensing signal received from at least one second electrode not overlapping the large-area conductor from among the plurality of second electrodes.

In the fourth mode, another frame period among the plurality of frame periods may be provided after the one frame period and is a blank period.

BRIEF DESCRIPTION OF THE DRAWINGS

The above and other objects and features of the present disclosure will become more apparent by describing in detail embodiments thereof with reference to the accompanying drawings.

DETAILED DESCRIPTION

Figure 1:
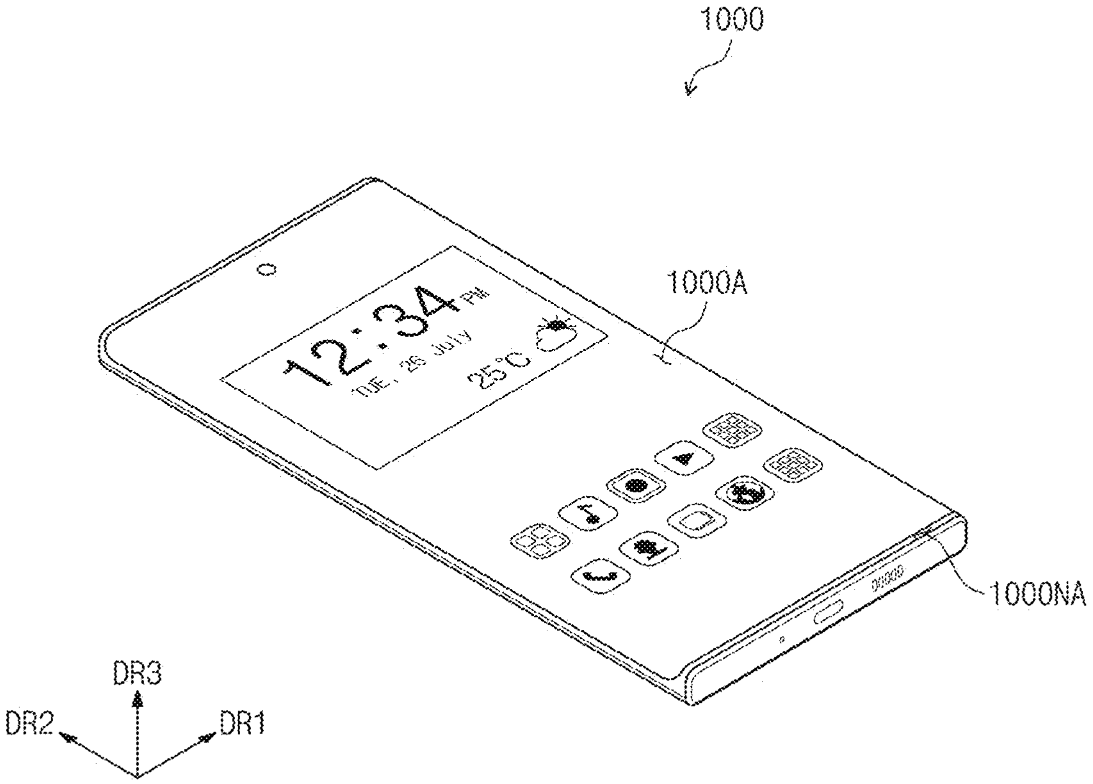
FIG. 1 is a perspective view of an electronic device according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The expression "and/or" includes one or more combinations which associated components are capable of defining.

It will be understood that the terms "first," "second," "third," etc. are used herein to distinguish one element from another, and the elements are not limited by these terms. Thus, a "first" element in an embodiment may be described as a "second" element in another embodiment.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

FIG. 1 is a perspective view of an electronic device according to an embodiment of the present disclosure.

Referring to FIG. 1, an electronic device 1000 may be a device that is activated depending on an electrical signal. For example, the electronic device 1000 may include a mobile phone, a foldable mobile phone, a notebook, a television, a tablet, an automotive navigation system, a game console, or a wearable device, but the present disclosure is not limited thereto. An example in which the electronic device 1000 is a mobile phone is illustrated in FIG. 1.

An active area 1000A and a peripheral area (or non-active area) 1000NA may be defined in the electronic device 1000. The electronic device 1000 may display an image through the active area 1000A. The active area 1000A may include a surface defined by a first direction DR1 and a second direction DR2. The peripheral area 1000NA may surround the active area 1000A.

A thickness direction of the electronic device 1000 may be parallel to a third direction DR3 intersecting the first direction DR1 and the second direction DR2. Accordingly, front surfaces (or top/upper surfaces) and rear surfaces (or bottom/lower surfaces) of members constituting the electronic device 1000 may be defined with respect to the third direction DR3. The third direction DR3 may also be referred to as a thickness direction of the electronic device 1000.

Figure 2:
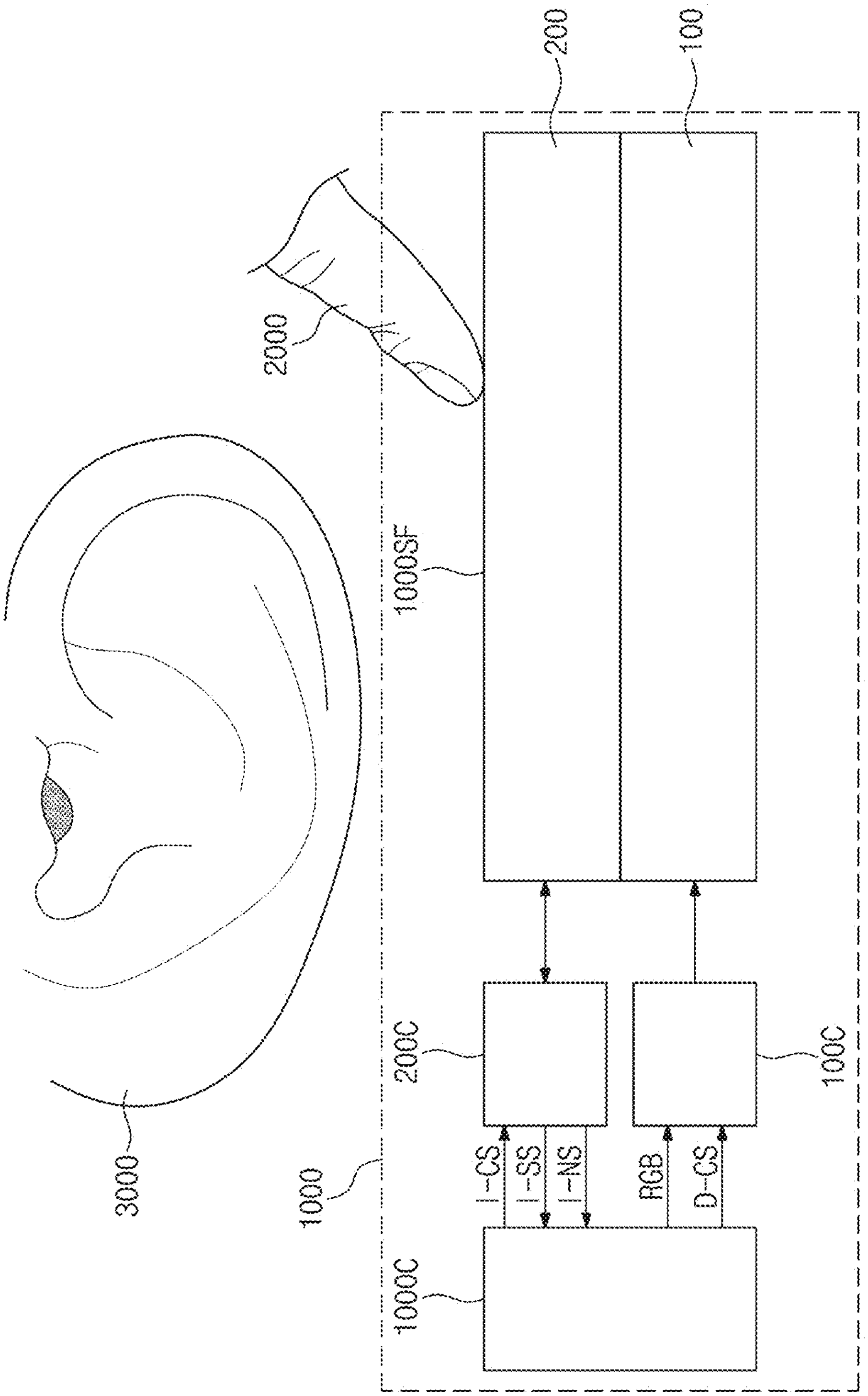
FIG. 2 is a block diagram illustrating an electronic device according to an embodiment of the present disclosure.

FIG. 2 is a block diagram illustrating an electronic device according to an embodiment of the present disclosure.

Referring to FIG. 2, the electronic device 1000 may include a display layer 100, a sensor layer 200, a display driving unit 100C (also referred to as a display driving circuit), a sensor driving unit 200C (also referred to as a sensor driving circuit), and a main driving unit 1000C (also referred to as a main driving circuit).

The display layer 100 may be a component that substantially generates an image. The display layer 100 may display the image during a plurality of frame periods. The display layer 100 may be an emission-type display layer. For example, the display layer 100 may be an organic light emitting display layer, a quantum dot display layer, a micro-LED display layer, or a nano-LED display layer.

The sensor layer 200 may be disposed on the display layer 100. The sensor layer 200 may sense an external input 2000 or 3000 applied from outside of the electronic device 1000. The external input 2000 or 3000 may include all input means capable of providing a change in capacitance. For example, the sensor layer 200 may sense an input by an active-type input means providing a transmit signal, in addition to a passive-type input means such as contact or proximity with a body part of the user. The external input 2000 or 3000 may include an input by a touch 2000 of the user and a proximity input by a large-area conductor 3000. In FIG. 3, the large-area conductor 3000 is the ear of a user. However, the large-area conductor 3000 is not limited thereto.

The main driving unit 1000C may control an overall operation of the electronic device 1000. For example, the main driving unit 1000C may control operations of the display driving unit 100C and the sensor driving unit 200C. The main driving unit 1000C may include at least one microprocessor, and the main driving unit 1000C may be referred to as a "host." The main driving unit 1000C may further include a graphics controller.

The display driving unit 100C may drive the display layer 100 in units of the plurality of frame periods. The display driving unit 100C may receive image data RGB and a control signal D-CS from the main driving unit 1000C. The control signal D-CS may include various signals. For example, the control signal D-CS may include a mode signal that decides a driving mode, an input vertical synchronization signal, an input horizontal synchronization signal, a main clock, a data enable signal, etc. The display driving unit 100C may generate a scan control signal and a data control signal that control the driving of the display layer 100 based on the control signal D-CS. The display driving unit 100C may drive the display layer 100 in a first display mode DMD1 (refer to FIG. 8), a second display mode DMD2 (refer to FIG. 8), or a third display mode DMD3 (refer to FIG. 8).

The sensor driving unit 200C may drive the sensor layer 200. The sensor driving unit 200C may receive a control signal I-CS from the main driving unit 1000C. The control signal I-CS may include the mode decision signal that decides the driving mode of the sensor driving unit 200C and the clock signal. The sensor driving unit 200C may drive the sensor layer 200 in a first mode MD1 (refer to FIG. 8), a second mode MD2 (refer to FIG. 8), a third mode MD3 (refer to FIG. 8), a fourth mode MD4 (refer to FIG. 20), a first sub-mode SMD1 (refer to FIG. 20), or a second sub-mode. This will be described in further detail below.

The sensor driving unit 200C may calculate coordinates of an input based on a signal received from the sensor layer 200 and may provide a coordinate signal I-SS including information about the coordinates to the main driving unit 1000C. The main driving unit 1000C executes an operation corresponding to the user input based on the coordinate signal I-SS. For example, the main driving unit 1000C may drive the display driving unit 100C such that a new application image is displayed in the display layer 100.

The sensor driving unit 200C may sense the approach of the large-area conductor 3000 spaced from a surface 1000SF of the electronic device 1000, based on the signal received from the sensor layer 200. The spaced large-area conductor 3000 may be referred to as a "hovering object." An ear of the user coming close to the electronic device 1000 is illustrated as an example of the spaced large-area conductor 3000. However, this is only an example, and the large-area conductor 3000 may be, for example, a face of the user. The sensor driving unit 200C may provide the main driving unit 1000C with a proximity sensing signal I-NS including proximity object sensing information.

The main driving unit 1000C may receive the proximity sensing signal I-NS, may combine and process sensing values, which are received from other sensors that sense the large-area conductor 3000, with the proximity sensing signal I-NS, and may determine a proximity state based on the processing result. For example, the main driving unit 1000C may receive sensing values from the sensor layer 200, an infrared sensor IR (refer to FIG. 17), and a gesture sensor GS (refer to FIG. 17), may combine the sensing values, and may determine a proximity state based on the combination result. In this case, the sensing value received from the sensor layer 200 may be the proximity sensing signal I-NS.

Figure 3A:
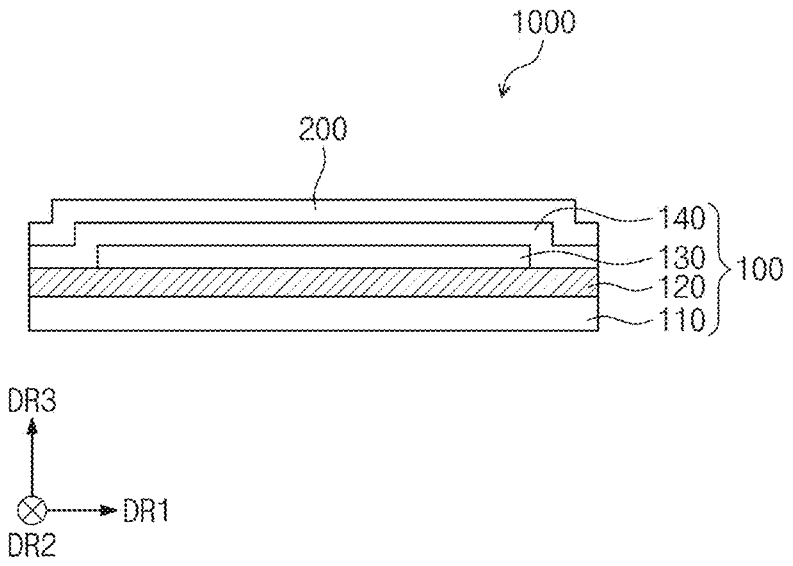
FIG. 3A is a cross-sectional view of an electronic device according to an embodiment of the present disclosure.

FIG. 3A is a cross-sectional view of an electronic device according to an embodiment of the present disclosure.

Referring to FIG. 3A, the display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be, for example, a glass substrate, a metal substrate, a polymer substrate, etc. However, embodiments are not limited thereto. For example, the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be collectively referred to as a "base barrier layer."

Each of the first and second synthetic resin layers may include a polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. The expression "~~-based resin" in the specification indicates that "~~-based resin" includes the functional group of "~~."

The circuit layer 120 may be disposed on the base layer 110. The circuit layer 120 may include, for example, an insulating layer, a semiconductor pattern, a conductive pattern, a signal line, etc. An insulating layer, a semiconductor layer, and a conductive layer may be formed on the base layer 110 by a coating or deposition process, and the insulating layer, the semiconductor layer, and the conductive layer may then be selectively patterned through a plurality of photolithography processes. Subsequently, the semiconductor pattern, the conductive pattern, and the signal line included in the circuit layer 120 may be formed.

The light emitting element layer 130 may be disposed on the circuit layer 120. The light emitting element layer 130 may include a light emitting device. For example, the light emitting element layer 130 may be an organic light emitting material, a quantum dot, a quantum rod, a micro LED, or a nano LED.

The encapsulation layer 140 may be disposed on the light emitting element layer 130. The encapsulation layer 140 may protect the light emitting element layer 130 from foreign substances such as, for example, moisture, oxygen, and dust particles.

The sensor layer 200 may be disposed on the display layer 100. The sensor layer 200 may sense an external input applied from outside of the electronic device 1000. The external input may be an input of the user. The user input may include various types of external inputs such as, for example, a part of a user's body, a light, heat, a pen, or pressure.

The sensor layer 200 may be formed on the display layer 100 through a successive process. In this case, the sensor layer 200 may be expressed as being directly disposed on the display layer 100. The expression "~being directly disposed~" indicates that a third component is not interposed between the sensor layer 200 and the display layer 100. In other words, in this case, an additionally adhesive member is not interposed between the sensor layer 200 and the display layer 100. Alternatively, the sensor layer 200 may be bonded to the display layer 100 through an adhesive member. The adhesive member may include a typical adhesive or sticking agent.

In an embodiment, the electronic device 1000 may further include an anti-reflection layer and an optical layer on the sensor layer 200. The anti-reflection layer may reduce the reflectance of an external light incident from outside of the electronic device 1000. The optical layer may increase the front luminance of the electronic device 1000 by controlling a direction of a light incident from the display layer 100.

Figure 3B:
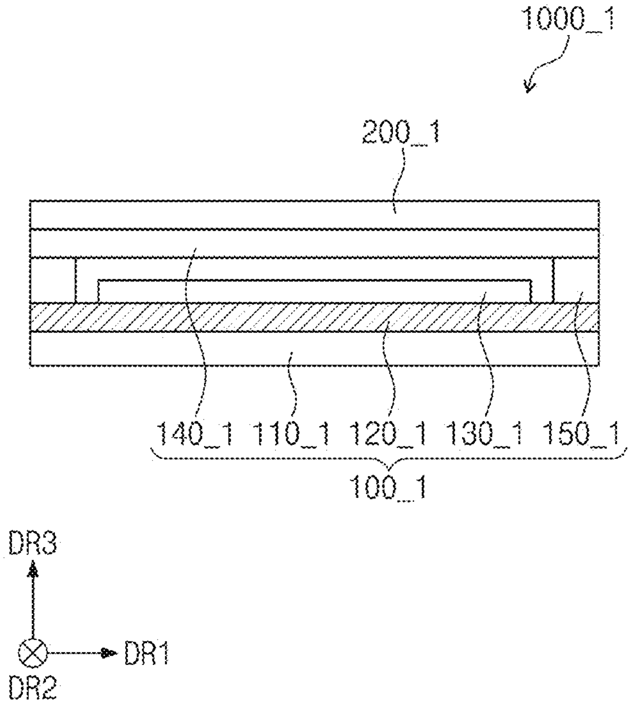
FIG. 3B is a cross-sectional view of an electronic device according to an embodiment of the present disclosure.

FIG. 3B is a cross-sectional view of an electronic device according to an embodiment of the present disclosure.

Referring to FIG. 3B, an electronic device 1000_1 may include a display layer 100_1 and a sensor layer 200_1. The display layer 100_1 may include a base substrate 110_1, a circuit layer 120_1, a light emitting element layer 130_1, an encapsulation substrate 140_1, and a coupling member 150_1.

Each of the base substrate 110_1 and the encapsulation substrate 140_1 may be, for example, a glass substrate, a metal substrate, or a polymer substrate, but is not particularly limited thereto.

The coupling member 150_1 may be interposed between the base substrate 110_1 and the encapsulation substrate 140_1. The coupling member 150_1 may couple the encapsulation substrate 140_1 to the base substrate 110_1 or the circuit layer 120_1. The coupling member 150_1 may include an inorganic material or an organic material. For example, the inorganic material may include a frit seal, and the organic material may include a photo-curable resin or a photo-plastic resin. However, the material forming the coupling member 150_1 is not limited to the above examples.

The sensor layer 200_1 may be directly disposed on the encapsulation substrate 140_1. The expression "directly disposed" means that a third component is not interposed between the sensor layer 200_1 and the encapsulation substrate 140_1. That is, in this case, a separate adhesive member may is interposed between the sensor layer 200_1 and the display layer 100_1. However, the present disclosure is not limited thereto. For example, an adhesive layer may be further interposed between the sensor layer 200_1 and the encapsulation substrate 140_1.

Figure 4:
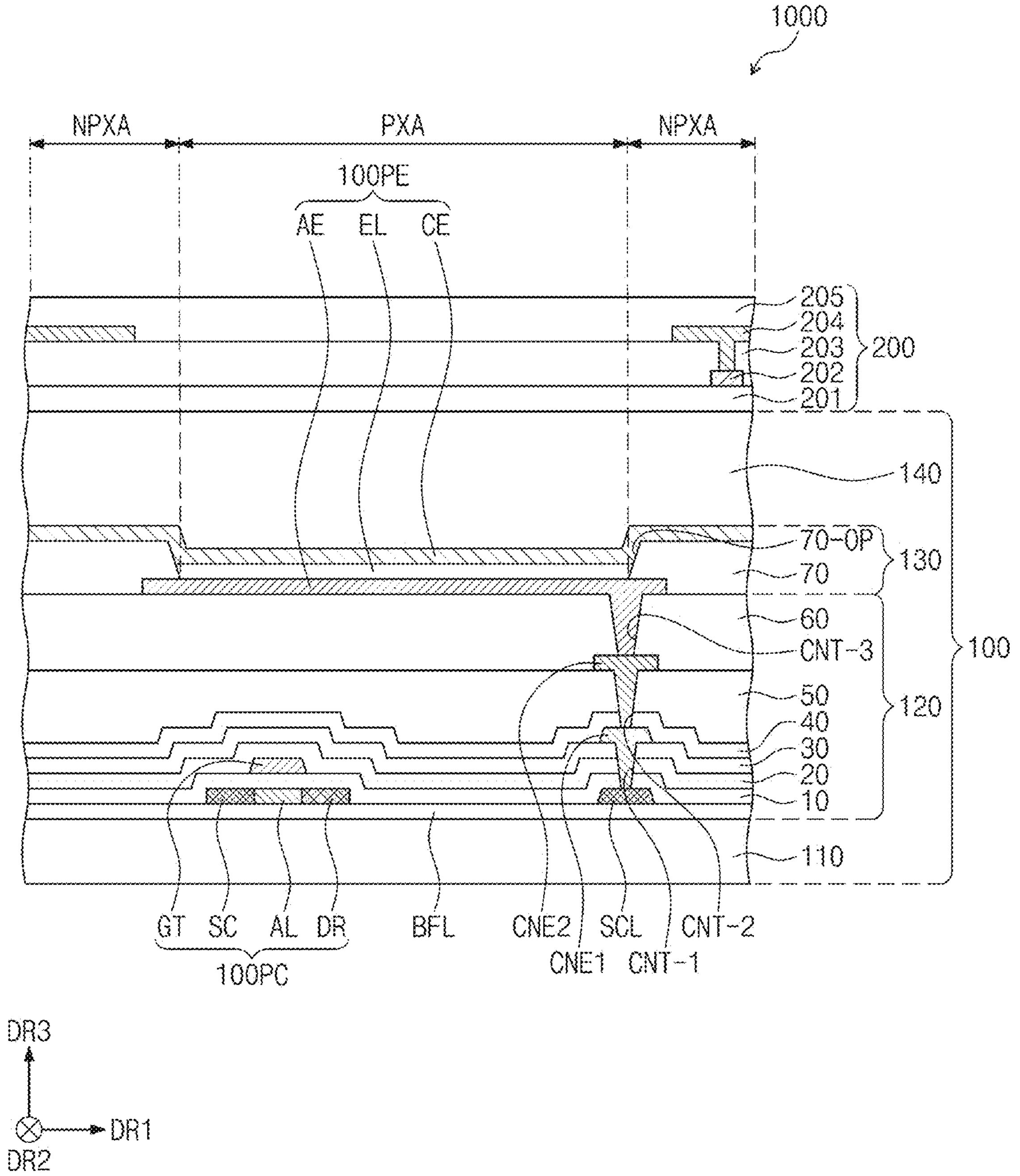
FIG. 4 is a cross-sectional view of an electronic device according to an embodiment of the present disclosure.

FIG. 4 is a cross-sectional view of an electronic device according to an embodiment of the present disclosure.

Referring to FIG. 4, at least one inorganic layer is formed on an upper surface of the base layer 110. The inorganic layer may include at least one of, for example, aluminum oxide, titanium oxide, silicon oxide, silicon nitride, silicon oxynitride, zirconium oxide, and hafnium oxide. The inorganic layer may be formed of multiple layers. The multiple inorganic layers may constitute a barrier layer and/or a buffer layer. In an embodiment, the display layer 100 is illustrated as including a buffer layer BFL.

The buffer layer BFL may increase a bonding force between the base layer 110 and a semiconductor pattern. The buffer layer BFL may include at least one of, for example, silicon oxide, silicon nitride, and silicon oxynitride. For example, the buffer layer BFL may include a structure in which a silicon oxide layer and a silicon nitride layer are stacked alternately.

The semiconductor pattern may be disposed on the buffer layer BFL. The semiconductor pattern may include polysilicon. However, the present disclosure is not limited thereto. For example, the semiconductor pattern may include amorphous silicon, low-temperature polycrystalline silicon, or an oxide semiconductor.

For convenience of illustration, FIG. 4 illustrates only a portion of the semiconductor pattern, and the semiconductor pattern may be further disposed in another area. Semiconductor patterns may be arranged across pixels in a specific rule. An electrical property of the semiconductor pattern may vary depending on whether the semiconductor pattern is doped. The semiconductor pattern may include a first area having higher conductivity and a second area having lower conductivity relative to the first area. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a concentration lower than the concentration of the first area.

The conductivity of the first area may be higher than the conductivity of the second area, and the first area may substantially serve as an electrode or a signal line. The second area may substantially correspond to an active (or channel) of a transistor. In other words, a portion of the semiconductor pattern may be an active of a transistor, another portion thereof may be a source or a drain of the transistor, and another portion thereof may be a connection electrode or a connection signal line.

Each of pixels may be expressed by an equivalent circuit including 7 transistors, one capacitor, and a light emitting element 100PE, and the equivalent circuit of the pixel may be modified in various forms. One transistor 100PC and one light emitting element 100PE that are included in the pixel are illustrated in FIG. 4 as an example.

A source SC, an active AL, and a drain DR of the transistor 100PC may form from the semiconductor pattern. The source SC and the drain DR may extend from the active AL in directions facing away from each other in a cross-sectional view. A portion of a connection signal line SCL forming from the semiconductor pattern is illustrated in FIG. 4. In an embodiment, the connection signal line SCL may be connected to the drain DR of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer structure or a multi-layer structure. The first insulating layer 10 may include at least one of, for example, aluminum oxide, titanium oxide, silicon oxide, silicon nitride, silicon oxynitride, zirconium oxide, and hafnium oxide. In an embodiment, the first insulating layer 10 may be a single silicon oxide layer. As well as the first insulating layer 10, an insulating layer of the circuit layer 120 to be described later may be an inorganic layer and/or an organic layer, and may have a single-layer or multi-layer structure. The inorganic layer may include at least one of the materials described above but is not limited thereto.

A gate GT of the transistor 100PC is disposed on the first insulating layer 10. The gate GT may be a portion of a metal pattern. The gate GT overlaps the active AL. The gate GT may function as a mask in the process of doping the semiconductor pattern.

A second insulating layer 20 may be disposed on the first insulating layer 10 and may cover the gate GT. The second insulating layer 20 may overlap the pixels in common. The second insulating layer 20 may be an inorganic layer and/or an organic layer, and may have a single-layer structure or a multi-layer structure. The second insulating layer 20 may include at least one of, for example, silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may be an organic light emitting material, a quantum dot, a quantum rod, a micro LED, or a nano LED. Below, an example in which the light emitting element 100PE is an organic light emitting element will be described, but the light emitting element 100PE is not particularly limited thereto.

The light emitting element 100PE includes a first electrode AE, an emission layer EL, and a second electrode CE.

The first electrode AE may be disposed on the sixth insulating layer 60. The first electrode AE may be connected to the second connection electrode CNE2 through a contact hole CNT-3 penetrating the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

The active area 1000A (refer to FIG. 1) may include an emission area PXA and a non-emission area NPXA adjacent to the emission area PXA. The non-emission area NPXA surrounds the emission area PXA. In an embodiment, the emission area PXA is defined to correspond to the portion of the first electrode AE, which is exposed by the opening 70-OP.

The emission layer EL may be disposed on the first electrode AE. The emission layer EL may be disposed in the area defined by the opening 70-OP. That is, the emission layer EL may be independently formed for each pixel. In the case where the emission layer EL is independently formed for each pixel, each of the emission layers EL may emit a light of at least one of, for example, a blue color, a red color, and a green color. However, the present disclosure is not limited thereto, and the emission layer EL may be connected to the pixels in common. In this case, the emission layer EL may provide a blue light or may provide a white light.

The second electrode CE may be disposed on the emission layer EL. The second electrode CE may have an integrated shape and may be disposed in a plurality of pixels in common.

In an embodiment, a hole control layer may be interposed between the first electrode AE and the light emitting layer EL. The hole control layer may be disposed in common in the emission area PXA and the non-emission area NPXA. The hole control layer may include a hole transport layer and may further include a hole injection layer. An electron control layer may be interposed between the emission layer EL and the second electrode CE. The electron control layer may include an electron transport layer and may further include an electron injection layer. The hole control layer and the electron control layer may be formed, in common, in a plurality of pixels by using an open mask.

The encapsulation layer 140 may be disposed on the light emitting element layer 130. The encapsulation layer 140 may include, for example, an inorganic layer, an organic layer, and an inorganic layer sequentially stacked, however, layers constituting the encapsulation layer 140 are not limited thereto.

The inorganic layers may protect the light emitting element layer 130 from, for example, moisture and oxygen, and the organic layer may protect the light emitting element layer 130 from, for example, a foreign material such as dust particles. The inorganic layers may include, for example, a silicon nitride layer, a silicon oxynitride layer, a silicon oxide layer, a titanium oxide layer, an aluminum oxide layer, or the like. The organic layer may include, for example, an acrylic-based organic layer, but is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least one of, for example, silicon nitride, silicon oxynitride, and silicon oxide. Alternatively, the base layer 201 may be an organic layer including epoxy resin, acrylate resin, or imide-based resin. The base layer 201 may have a single-layer structure or may have a multi-layer structure in which multiple layers are stacked in the third direction DR3.

Each of the first conductive layer 202 and the second conductive layer 204 may have a single-layer structure or may have a multi-layer structure in which multiple layers are stacked in the third direction DR3.

The conductive layer of the single-layer structure may include a metal layer or a transparent conductive layer. The metal layer may include, for example, molybdenum, silver, titanium, copper, aluminum, or alloy thereof. The transparent conductive layer may include transparent conductive oxide such as, for example, indium tin oxide (ITO), indium zinc oxide (IZO), zinc oxide (ZnO), or indium zinc tin oxide (IZTO). In addition, the transparent conductive layer may include conductive polymer such as, for example, PEDOT, metal nanowire, graphene, etc.

The conductive layer of the multi-layer structure may include metal layers. The metal layers may have, for example, a three-layer structure of titanium/aluminum/titanium. The conductive layer of the multi-layer structure may include at least one metal layer and at least one transparent conductive layer.

At least one of the sensing insulating layer 203 and the cover insulating layer 205 may include an inorganic layer. The inorganic layer may include at least one of, for example, aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic film may include at least one of, for example, acrylic-based resin, methacrylic-based resin, polyisoprene, vinyl-based resin, epoxy-based resin, urethane-based resin, cellulose-based resin, siloxane-based resin, polyimide-based resin, polyamide-based resin, and perylene-based resin.

Figure 5:
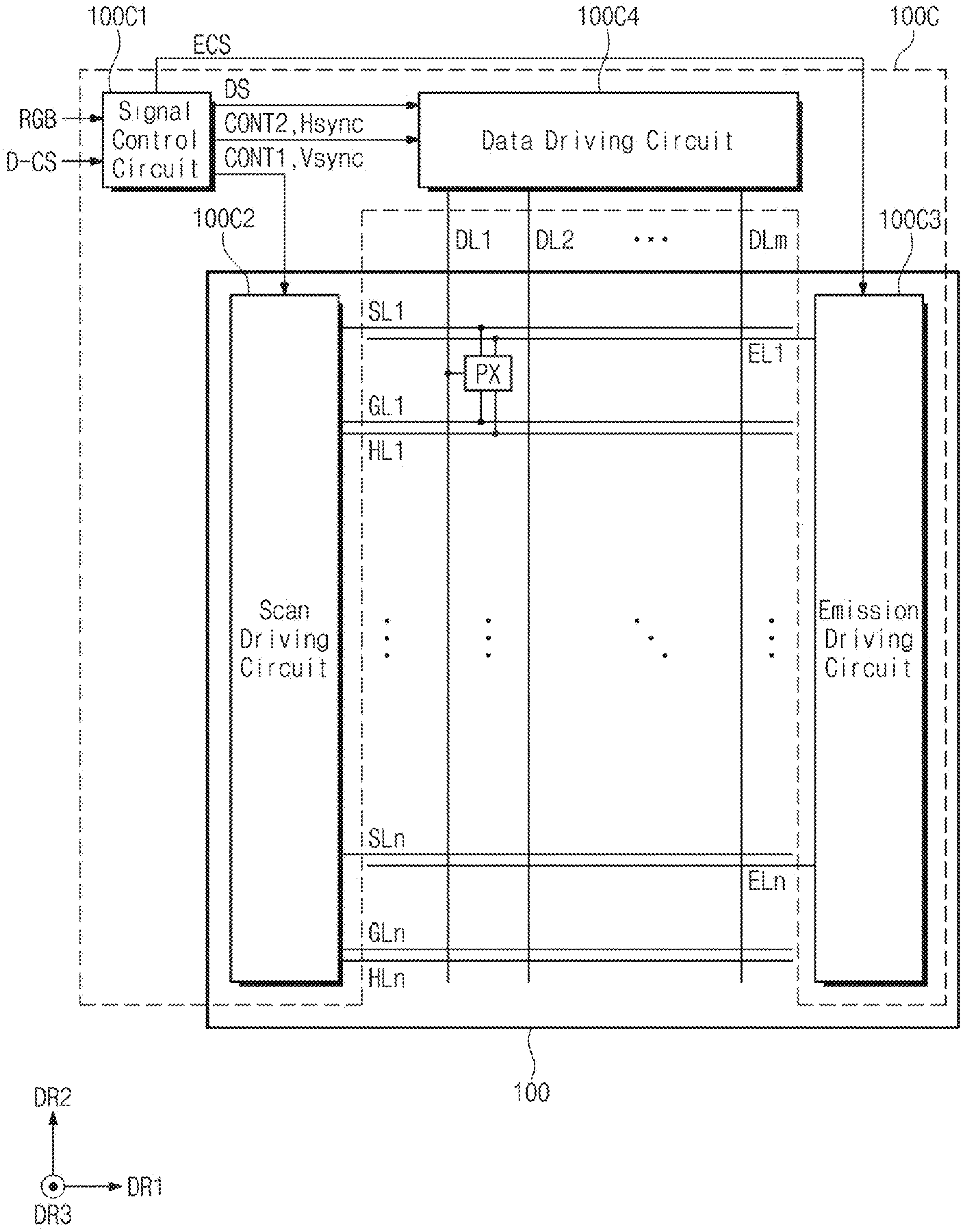
FIG. 5 is a block diagram of a display layer and a display driving unit according to an embodiment of the present disclosure.

FIG. 5 is a block diagram of a display layer and a display driving unit according to an embodiment of the present disclosure.

Referring to FIG. 5, the display layer 100 may include a plurality of first scan lines SL1 to SLn, a plurality of second scan lines GL1 to GLn, a plurality of third scan lines HL1 to HLn, a plurality of emission control lines EL1 to ELn, a plurality of data lines DL1, DL2 . . . to DLm, and a plurality of pixels PX, where n is a positive integer. The plurality of first scan lines SL1 to SLn, the plurality of second scan lines GL1 to GLn, the plurality of third scan lines HL1 to HLn, and the plurality of emission control lines EL1 to ELn may extend along the first direction DR1, and the plurality of first scan lines SL1 to SLn, the plurality of second scan lines GL1 to GLn, the plurality of third scan lines HL1 to HLn, and the plurality of emission control lines EL1 to ELn may be arranged to be spaced from each other in the second direction DR2. The plurality of data lines DL1 to DLm may extend in the second direction DR2, and the plurality of data lines DL1 to DLm may be arranged to be spaced from each other in the first direction DR1.

The display driving unit 100C may include a signal control circuit 100C1, a scan driving circuit 100C2, an emission driving circuit 100C3, and a data driving circuit 100C4.

The signal control circuit 100C1 may receive the image data RGB and the control signal D-CS from the main driving unit 1000C (refer to FIG. 2). The control signal D-CS may include various signals. For example, the control signal D-CS may include an input vertical synchronization signal, an input horizontal synchronization signal, a main clock, a data enable signal, etc.

The signal control circuit 100C1 may generate a first control signal CONT1 and a vertical synchronization signal Vsync based on the control signal D-CS, and may output the first control signal CONT1 and the vertical synchronization signal Vsync to the scan driving circuit 100C2. The vertical synchronization signal Vsync may be included in the first control signal CONT1.

The signal control circuit 100C1 may generate a third control signal ECS based on the control signal D-CS, and may output the third control signal ECS to the emission driving circuit 100C3.

The signal control circuit 100C1 may generate a second control signal CONT2 and a horizontal synchronization signal Hsync based on the control signal D-CS, and may output the second control signal CONT2 and the horizontal synchronization signal Hsync to the data driving circuit 100C4. The horizontal synchronization signal Hsync may be included in the second control signal CONT2.

The signal control circuit 100C1 may also provide the data driving circuit 100C4 with a driving signal DS that is obtained by processing the image data RGB so as to be appropriate for an operation condition of the display layer 100. The first control signal CONT1 and the second control signal CONT2, which are signals utilized for operations of the scan driving circuit 100C2 and the data driving circuit 100C4, are not particularly limited.

The scan driving circuit 100C2 drives the plurality of first scan lines SL1 to SLn, the plurality of second scan lines GL1 to GLn, and the plurality of third scan lines HL1 to HLn in response to the first control signal CONT1 and the vertical synchronization signal Vsync. In an embodiment of the present disclosure, the scan driving circuit 100C2 may be formed in the same process as the circuit layer 120 (refer to FIG. 4) in the display layer 100, but the present disclosure is not limited thereto. For example, the scan driving circuit 100C2 may be implemented with an integrated circuit (IC). In embodiments, to establish an electrical connection with the display layer 100, the integrated circuit may be directly mounted in a given area of the display layer 100 or may be mounted on a separate printed circuit board in a chip-on-film (COF) manner.

The emission driving circuit 100C3 receives the third control signal ECS from the signal control circuit 100C1. The emission driving circuit 100C3 may output emission control signals to the emission control lines EL1 to ELn in response to the third control signal ECS.

The data driving circuit 100C4 may output grayscale voltages to the plurality of data lines DL1 to DLm in response to the second control signal CONT2, the horizontal synchronization signal Hsync, and the driving signal DS received from the signal control circuit 100C1. The data driving circuit 100C4 may be implemented with an integrated circuit. In embodiments, to establish electrical connection with the display layer 100, the integrated circuit may be directly mounted in a given area of the display layer 100 or may be mounted on a separate printed circuit board in the chip-on-film manner. However, the present disclosure is not limited thereto. For example, the data driving circuit 100C4 may be formed in the same process as the circuit layer 120 (refer to FIG. 4) in the display layer 100.

Figure 6:
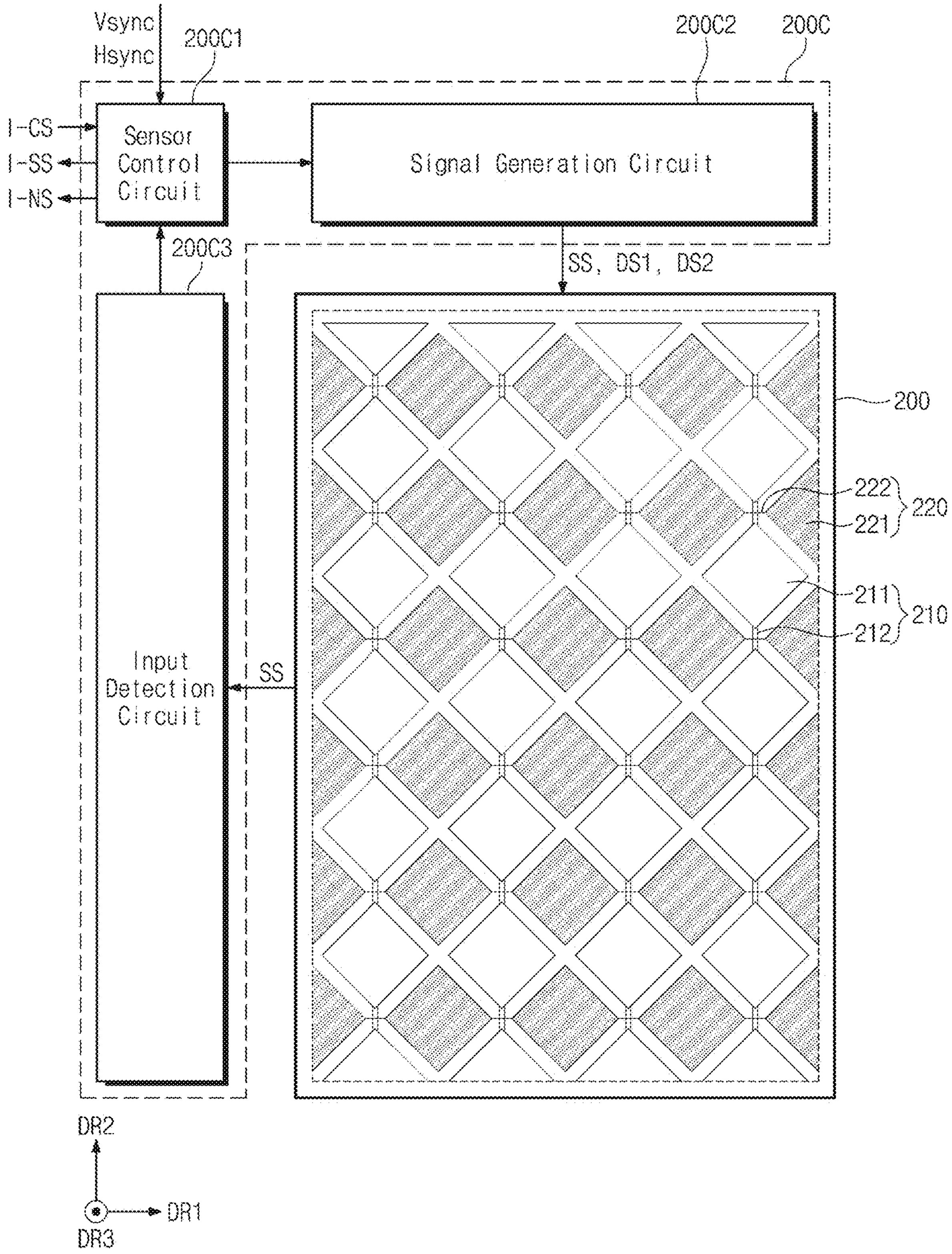
FIG. 6 is a block diagram of a sensor layer and a sensor driving unit according to an embodiment of the present disclosure.

FIG. 6 is a block diagram of a sensor layer and a sensor driving unit according to an embodiment of the present disclosure.

Referring to FIG. 6, the sensor layer 200 may include a plurality of first electrodes 210 and a plurality of second electrodes 220. The plurality of second electrodes 220 may intersect the plurality of first electrodes 210. The sensor layer 200 may further include a plurality of signal lines connected to the plurality of first electrodes 210 and the plurality of second electrodes 220.

Each of the plurality of first electrodes 210 may include a sensing pattern 211 and a bridge pattern 212. Two sensing patterns 211 that are adjacent to each other may be electrically connected to each other by two bridge patterns 212, but the present disclosure is not particularly limited thereto. Two bridge patterns 212 may be insulated from the second portion 222 and may intersect the second portion 222. The sensing pattern 211 may be included in the second conductive layer 204 (refer to FIG. 4), and the bridge pattern 212 may be included in the first conductive layer 202 (refer to FIG. 4).

Each of the plurality of second electrodes 220 may include a first portion 221 and a second portion 222. The first portion 221 and the second portion 222 may have an integrated shape and may be disposed on the same layer. For example, the first portion 221 and the second portion 222 may be included in the second conductive layer 204 (refer to FIG. 4).

The sensor driving unit 200C may receive the control signal I-CS from the main driving unit 1000C (refer to FIG. 2) and may provide the coordinate signal I-SS or the proximity sensing signal I-NS to the main driving unit 1000C (refer to FIG. 2).

The sensor driving unit 200C may be implemented with an integrated circuit (IC). In embodiments, to establish electrical connection with the sensor layer 200, the integrated circuit may be directly mounted in a given area of the sensor layer 200 or may be mounted on a separate printed circuit board in a chip-on-film (COF) manner.

The sensor driving unit 200C may include a sensor control circuit 200C1, a signal generation circuit 200C2, and an input detection circuit 200C3. The sensor control circuit 200C1 may receive the vertical synchronization signal Vsync and the horizontal synchronization signal Hsync from the display driving unit 100C. The sensor control circuit 200C1 may control operations of the signal generation circuit 200C2 and the input detection circuit 200C3 based on the control signal I-CS, the vertical synchronization signal Vsync, and the horizontal synchronization signal Hsync.

The signal generation circuit 200C2 may output first transmit signals DS1 or second transmit signals DS2 to the sensor layer 200, for example, the first electrodes 210. When the sensor layer 200 operates in a first sensing mode (or a touch sensing mode), the signal generation circuit 200C2 may output the first transmit signals DS1 to the first electrodes 210. When the sensor layer 200 operates in a second sensing mode (or a proximity sensing mode) different from the first sensing mode, the signal generation circuit 200C2 may output the second transmit signals DS2 to the first electrodes 210. This will be described in further detail below. The input detection circuit 200C3 may receive a detection signal SS from second electrodes 220.

Figure 7:
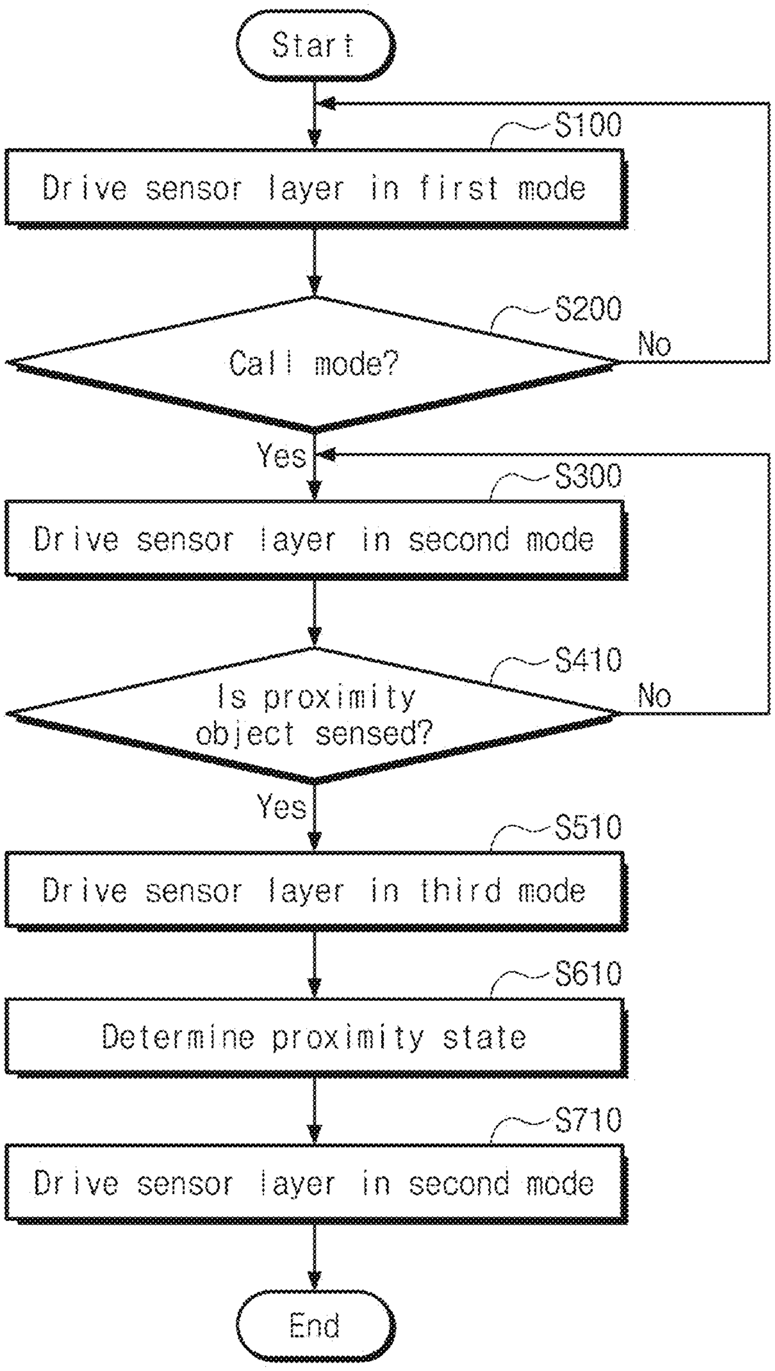
FIG. 7 is a flowchart illustrating a driving method of an electronic device according to an embodiment of the present disclosure.
Figure 8:
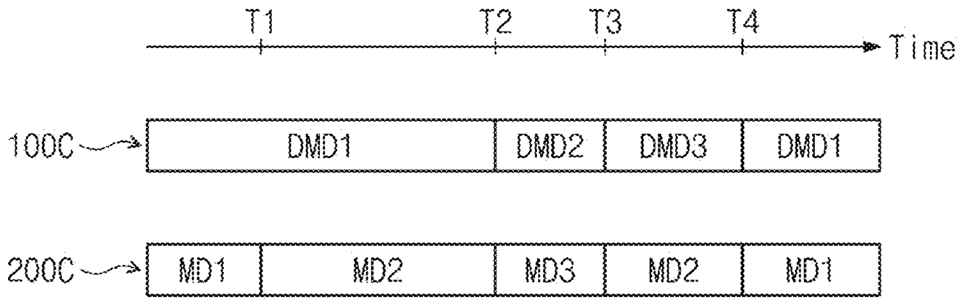
FIG. 8 is a diagram illustrating an electronic device according to an embodiment of the present disclosure.

FIG. 7 is a flowchart illustrating a method of driving an electronic device, according to an embodiment of the present disclosure. FIG. 8 is a diagram illustrating driving of an electronic device according to an embodiment of the present disclosure.

Referring to FIGS. 2, 7, and 8, the sensor driving unit 200C may drive the sensor layer 200 in the first mode MD1 (S100). In the first mode MD1, the sensor driving unit 200C may operate at a variable frequency depending on a driving frequency of the display layer 100.

The first mode MD1 may refer to a mode that senses the touch 2000 of the user on the sensor layer 200. For example, when the user plays a game through the electronic device 1000, the user may directly touch the electronic device 1000 to play the game.

When the user makes a call (S200), the sensor driving unit 200C may allow the sensor layer 200 to operate in the second mode MD2 (S300). An operation in which the user makes a call may be referred to as a "call mode." The call mode may be defined as an operation of receiving a call or making a call. A time when the user makes a call may be defined as a first time T1. In the second mode MD2, the sensor driving unit 200C may operate at a fixed frequency. For example, the fixed frequency may be 60 Hz (hertz).

When the call mode has not been entered, that is, when the user does not make a call (S200), the sensor driving unit 200C may continue to drive the sensor layer 200 in the first mode MD1 (S100).

When the sensor layer 200 senses the large-area conductor 3000 in the second mode MD2 (S410), the sensor driving unit 200C may switch from the second mode MD2 to the third mode MD3 and may drive the sensor layer 200 (S510). A time when the sensor layer 200 senses the large-area conductor 3000 may be defined as a second time T2.

While the sensor driving unit 200C operates in the second mode MD2, the main driving unit 1000C may receive the proximity sensing signal I-NS from the sensor driving unit 200C. While the sensor driving unit 200C operates in the third mode MD3, the main driving unit 1000C may combine and process sensing values, which are received from other sensors sensing the large-area conductor 3000, with the proximity sensing signal I-NS, and may generate a proximity determination signal based on the processing result.

According to an embodiment of the present disclosure, in the second mode MD2, the sensor driving unit 200C may provide the proximity sensing signal I-NS sensed in a first proximity sensing section AS1 (refer to FIG. 9) to the main driving unit 1000C, and the main driving unit 1000C may provide a first proximity determination signal, which is generated based on the proximity sensing signal I-NS, to the sensor driving unit 200C. In an embodiment, in the third mode MD3, the sensor driving unit 200C may provide the proximity sensing signal I-NS sensed in the first proximity sensing section AS1 (refer to FIG. 9) to the main driving unit 1000C, and the main driving unit 1000C does not provide a second proximity determination signal, which is generated based on the proximity sensing signal I-NS, to the sensor driving unit 200C.

Unlike embodiments of the present disclosure, in the case where the main driving unit 1000C always provides the second proximity determination signal, the sensor driving unit 200C may repeatedly operate due to the proximity determination signal received from the main driving unit 1000C, resulting in an increase of power consumption of the sensor driving unit 200C. However, according to embodiments of the present disclosure, because the sensor layer 200 senses the large-area conductor 3000 in the second mode MD2, the role of the sensor layer 200 for determining a proximity state is not implemented in the third mode MD3. For example, according to embodiments, the main driving unit 1000C does not provide the second proximity determination signal to the sensor driving unit 200C until the proximity state is decided. Accordingly, power consumption of the sensor driving unit 200C may be reduced. In other words, the electronic device 1000 (refer to FIG. 1) in which power consumption is reduced may be provided.

When the main driving unit 1000C determines the proximity state in the third mode MD3 (S610), the sensor driving unit 200C may switch from the third mode MD3 to the second mode MD2 and may drive the sensor layer 200 (S710). The main driving unit 1000C may receive the proximity sensing signal I-NS, may combine and process sensing values, which are received from other sensors sensing the large-area conductor 3000, with the proximity sensing signal I-NS, and may determine the proximity state based on the processing result (S610). A time when the main driving unit 1000C determines (or decides) the proximity state may be defined as a third time T3. For example, the third time T3 may be a time when the main driving unit 1000C determines that the large-area conductor 3000 is close thereto.

That is, the third mode MD3 may be provided during a time period from the second time T2 to the third time T3.

When the user ends the call, the sensor driving unit 200C may again drive the sensor layer 200 in the first mode MD1. A time when the user ends the call may be defined as a fourth time T4.

The display driving unit 100C may drive the display layer 100 in the first display mode DMD1. In the first display mode DMD1, the display layer 100 may emit a light of predetermined luminance.

When the sensor layer 200 senses the large-area conductor 3000 in the second mode MD2 (S410), the display driving unit 100C may drive the display layer 100 in the second display mode DMD2. The second display mode DMD2 may be a mode different from the first display mode DMD1. The second display mode DMD2 may be provided while the sensor layer 200 is driven in the third mode MD3, that is, during a time period from the second time T2 to the third time T3. This will be described in further detail below.

When the main driving unit 1000C determines the proximity state in the third mode MD3 (S610), the display driving unit 100C may drive the display layer 100 in the third display mode DMD3. The third display mode DMD3 may be a mode different from the first display mode DMD1 and the second display mode DMD2. In the third display mode DMD3, the display layer 100 may be turned off. For example, when the user brings the electronic device 1000 to be close to his/her ear, because the user does not need to view the screen of the electronic device 1000, the display layer 100 may be turned off and in this case, a power saving mode may be performed.

When the user ends the call, the display driving unit 100C may again drive the display layer 100 in the first display mode DMD1.

Figure 9:
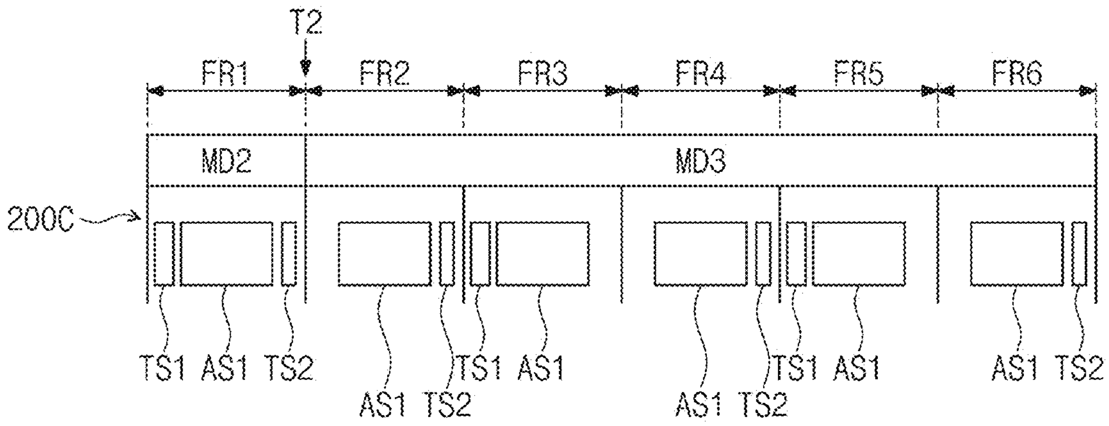
FIG. 9 is a conceptual diagram for describing an operation of a sensor driving unit according to an embodiment of the present disclosure.
Figure 10:
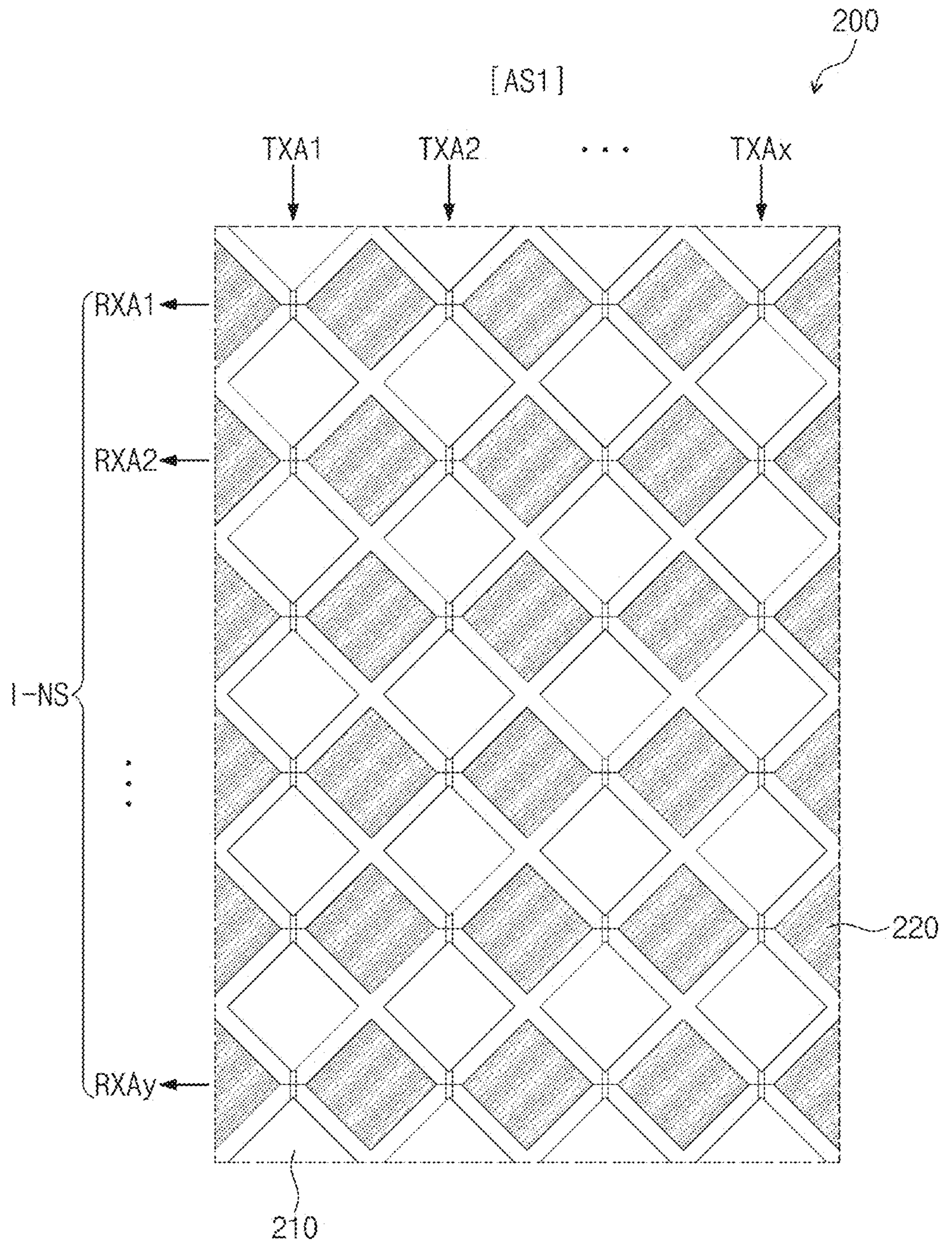
FIGS. 10 to 12 are conceptual diagrams for describing an operation of a sensor layer according to an embodiment of the present disclosure.
Figure 11:
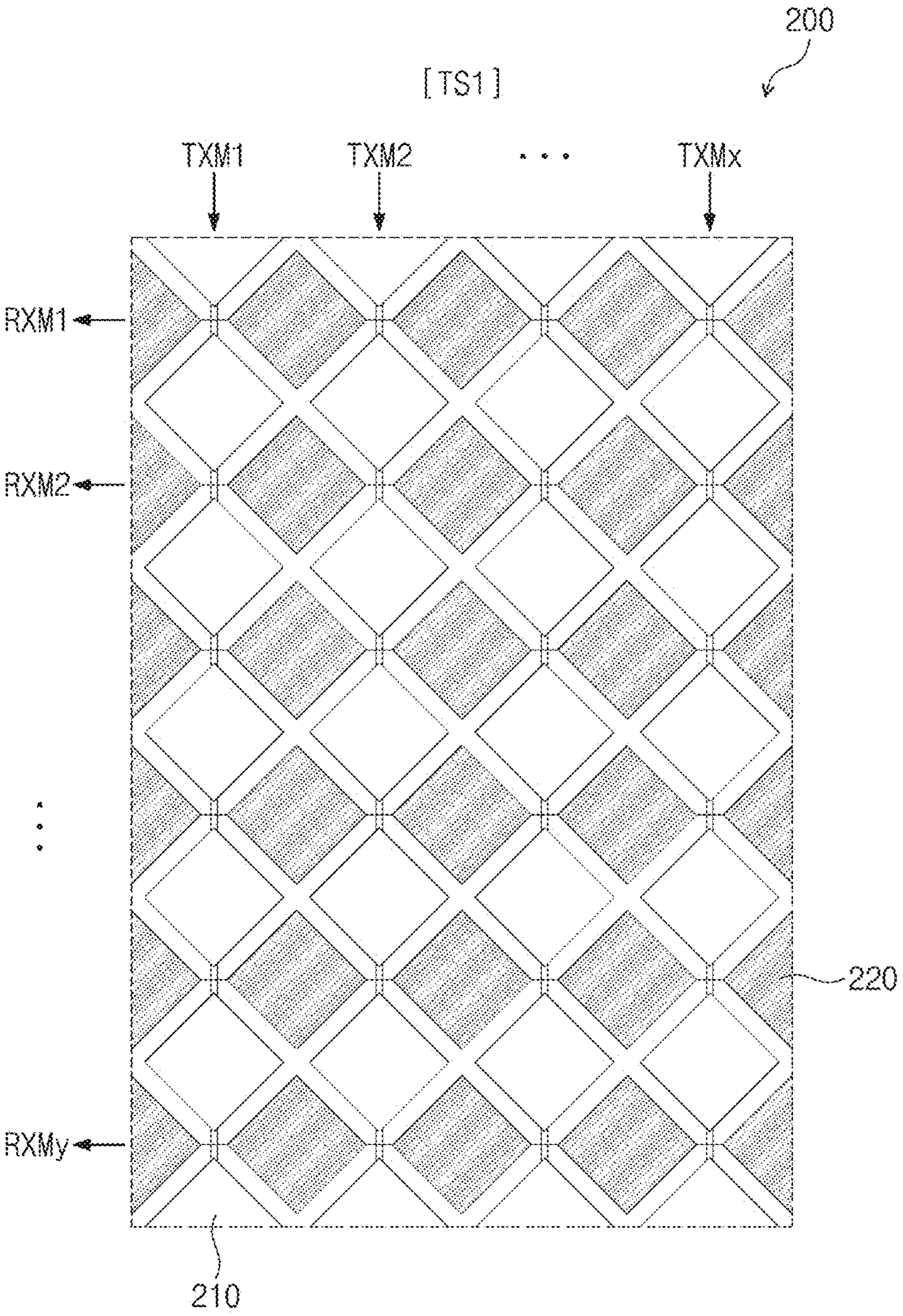
Figure 12:
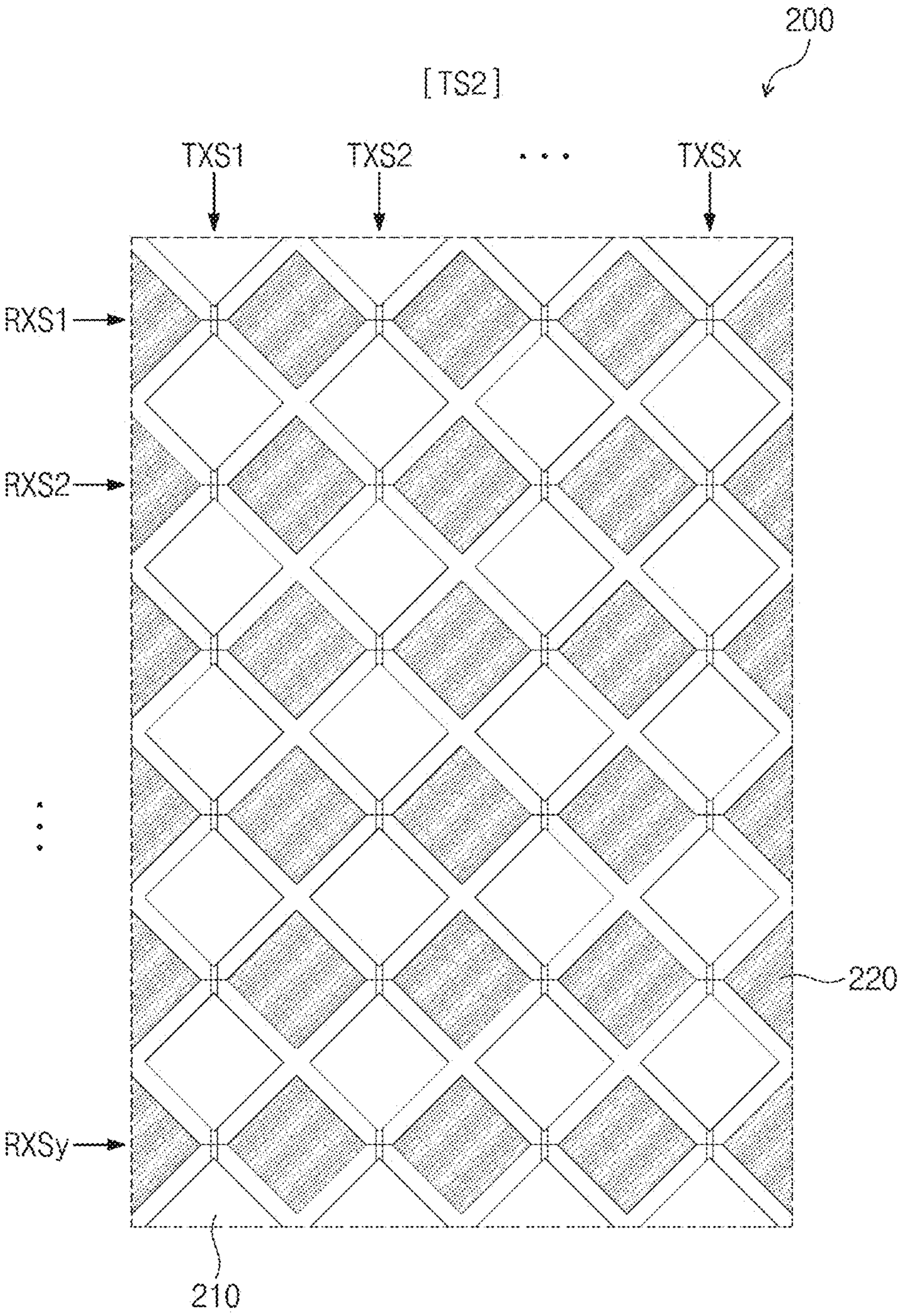

FIG. 9 is a conceptual diagram for describing an operation of a sensor driving unit according to an embodiment of the present disclosure. FIGS. 10 to 12 are conceptual diagrams for describing an operation of a sensor layer according to an embodiment of the present disclosure. In the description of FIGS. 10 to 12, components that are described with reference to FIG. 6 are marked by the same reference numerals/signs, and thus, for convenience of explanation, additional description will be omitted to avoid redundancy.

Referring to FIGS. 8 to 12, the display layer 100 may display an image in units of one frame period. For example, one frame period may be defined as a period from a rising edge to a falling edge of the vertical synchronization signal Vsync (refer to FIG. 5).

When the operating frequency of the display layer 100 is 60 Hz, a time corresponding to one frame period may be about 16.44 ms. However, this is only an example, and the operating frequency according to an embodiment of the present disclosure is not limited thereto. For example, when the operating frequency of the display layer 100 is 120 Hz, a time corresponding to one frame period may be about 8.33 ms.

The sensor driving unit 200C may operate while an image of one frame period is displayed in the display layer 100. That is, the sensor driving unit 200C may operate in units of a frame period.

One frame period FR1 among a plurality of frame periods in the second mode MD2 may include a first touch section TS1, a first proximity sensing section AS1, and a second touch section TS2.

The first proximity sensing section AS1 may refer to a section in which a proximity state of the large-area conductor 3000 (refer to FIG. 2) is sensed.

Referring to FIG. 10, in the first proximity sensing section AS1, the sensor driving unit 200C may output the plurality of first sensing signals TXA1 and TXA2 to TXAx (x being an integer of 3 or more) to the plurality of first electrodes 210, respectively, and may receive second sensing signals RXA1 and RXA2 to RXAy (y being an integer of 3 or more) from the plurality of second electrodes 220, respectively. The sensor driving unit 200C may output the second sensing signals RXA1 and RXA2 to RXAy to the main driving unit 1000C without modification. That is, the proximity sensing signal I-NS may include the second sensing signals RXA1 and RXA2 to RXAy. In this case, the plurality of first sensing signals TXA1 and TXA2 to TXAx may be referred to as the "second transmit signals DS2" (refer to FIG. 6).

The plurality of first sensing signals TXA1 and TXA2 to TXAx may be simultaneously output to the plurality of first electrodes 210. Also, the plurality of first sensing signals TXA1 and TXA2 to TXAx may be in phase, and waveforms of the plurality of first sensing signals TXA1 and TXA2 to TXAx may be identical to each other. According to embodiments of the present disclosure, as the intensity of a signal for detecting an object close to the electronic device 1000 (refer to FIG. 1) increases, the signal-to-noise ratio of the second sensing signals RXA1 and RXA2 to RXAy may increase. Accordingly, a proximity sensing recognition distance (or a possible object recognition height) may increase.

In the first proximity sensing section AS1, the sensor layer 200 may be referred to as operating in the second sensing mode (or the proximity sensing mode).

The first touch section TS1 may refer to a section in which the sensor layer 200 senses the presence or absence of an input made by the touch 2000 (refer to FIG. 2) of the user's body.

Referring to FIGS. 11, in the first touch section TS1, the sensor driving unit 200C may output a plurality of first sensing signals TXM1 and TXM2 to TXMx to the plurality of first electrodes 210, respectively, and may receive a plurality of second sensing signals RXM1 and RXM2 to RXMy from the plurality of second electrodes 220, respectively. In this case, the plurality of first sensing signals TXM1 and TXM2 to TXMx may be referred to as the "first transmit signals DS1" (refer to FIG. 6).

The sensor driving unit 200C may provide the main driving unit 1000C (refer to FIG. 2) with the coordinate signal I-SS obtained based on the plurality of second sensing signals RXM1 and RXM2 to RXMy. A data amount of the coordinate signal I-SS may be smaller than a data amount of the proximity sensing signal I-NS.

The sensor layer 200 may sense the touch 2000 (refer to FIG. 2) of the user's body through the capacitive coupling between the plurality of first electrodes 210 and the plurality of second electrodes 220. In this case, the sensor layer 200 may be defined as operating in a mutual touch method.

In the first touch section TS1, the sensor layer 200 may be referred to as operating in the first sensing mode.

The second touch section TS2 may refer to a section in which the sensor layer 200 senses the presence or absence of an input made by the touch 2000 (refer to FIG. 2) of the user's body.

Referring to FIG. 12, in the second touch section TS2, the sensor driving unit 200C may output a plurality of first sensing signals TXS1 and TXS2 to TXSx to the plurality of first electrodes 210, respectively, and may output a plurality of second sensing signals RXS1 and RXS2 to RXSy to the plurality of second electrodes 220, respectively.

The sensor layer 200 may sense the touch 2000 (refer to FIG. 2) of the user's body in a state where the plurality of first electrodes 210 and the plurality of second electrodes 220 are united into one electrode. In this case, the sensor layer 200 may be defined as operating in a self-touch method.

After the second time T2, the sensor driving unit 200C may operate in the third mode MD3.

In the third mode MD3, first frame periods FR2, FR4, and FR6 and second frame periods FR3 and FR5 among the plurality of frame periods may be alternately repeated.

Each of the first frame periods FR2, FR4, and FR6 may include the first proximity sensing section AS1 and the second touch section TS2 that are sequentially provided. For example, in the third mode MD3, each of the odd-numbered frame periods FR2, FR4, and FR6 may include the first proximity sensing section AS1 and the second touch section TS2. That is, in each of the odd-numbered frame periods FR2, FR4, and FR6, the first touch section TS1 may be excluded compared to one frame period FR1 in the second mode MD2.

Each of the second frame periods FR3 and FR5 may include the first touch section TS1 and the first proximity sensing section AS1 that are sequentially provided. For example, in the third mode MD3, each of the even-numbered frame periods FR3 and FR5 may include the first touch section TS1 and the first proximity sensing section AS1. That is, in each of the even-numbered frame periods FR3 and FR5, the second touch section TS2 may be excluded compared to one frame period FR1 in the second mode MD2.

According to embodiments of the present disclosure, a period in which the first touch section TS1 and the second touch section TS2 are provided may decrease during a time period from a time when the sensor layer 200 operating in the third mode MD3 senses the large-area conductor 3000 to a time when the main driving unit 1000C determines that the large-area conductor 3000 is close thereto. Each of the first touch section TS1 and the second touch section TS2 may be provided once every two frame periods. A period in which the sensor driving unit 200C provides the first sensing signals TXM1 and TXM2 to TXMx or TXS1 and TXS2 to TXSx during the third mode MD3 may decrease. Power consumption of the sensor driving unit 200C may be reduced. Accordingly, the electronic device 1000 (refer to FIG. 1) in which power consumption is reduced may be provided.

Figure 13A:
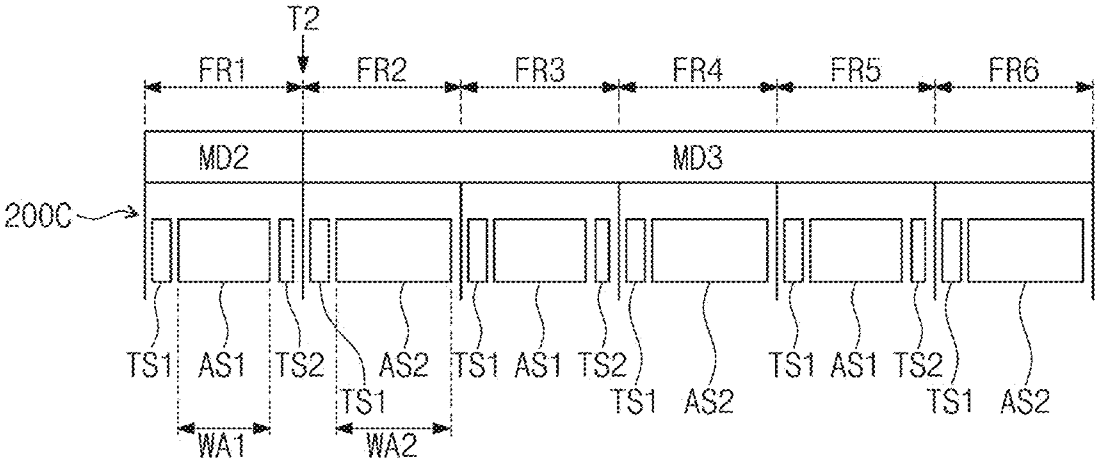
FIG. 13A is a conceptual diagram for describing an operation of a sensor driving unit according to an embodiment of the present disclosure.

FIG. 13A is a conceptual diagram for describing an operation of a sensor driving unit according to an embodiment of the present disclosure. In the description of FIG. 13A, the components that are described with reference to FIG. 9 are marked by the same reference numerals/signs, and thus, for convenience of explanation, additional description will be omitted to avoid redundancy.

Referring to FIG. 13A, in the third mode MD3, the first frame periods FR2, FR4, and FR6 and the second frame periods FR3 and FR5 among the plurality of frame periods may be alternately repeated.

Each of the first frame periods FR2, FR4 and FR6 may include the first touch section TS1 and a second proximity sensing section AS2 that are sequentially provided. For example, the first frame periods FR2, FR4 and FR6 may be odd-numbered frame periods FR2, FR4 and FR6 in the third mode MD3. A width WA2 of the second proximity sensing section AS2 may be longer than a width WA1 of the first proximity sensing section AS1. For example, the second proximity sensing section AS2 may have a shorter frequency than the first proximity sensing section AS1. Alternatively, the second proximity sensing section AS2 may be longer in transmission time than the first proximity sensing section AS1.

Each of the second frame periods FR3 and FR5 may include the first touch section TS1, the first proximity sensing section AS1, and the second touch section TS2 that are sequentially provided. For example, the second frame periods FR3 and FR5 may be the even-numbered frame periods FR3 and FR5 in the third mode MD3. Each of the second frame periods FR3 and FR5 may have the same configuration as one frame period FR1 among the plurality of frame periods in the second mode MD2.

According to embodiments of the present disclosure, a period in which the second touch section TS2 is provided during a time period from the second time T2 (refer to FIG. 8) to the third time T3 may decrease. The second touch section TS2 may be provided once every two frame periods. Also, the second proximity sensing section AS2, that is, a time period in which the first sensing signals TXA1 and TXA2 to TXAx (refer to FIG. 10) are transmitted, may increase. Accordingly, power consumption of the sensor driving unit 200C may be reduced. Accordingly, the electronic device 1000 (refer to FIG. 1) in which power consumption is reduced may be provided.

Figure 13B:
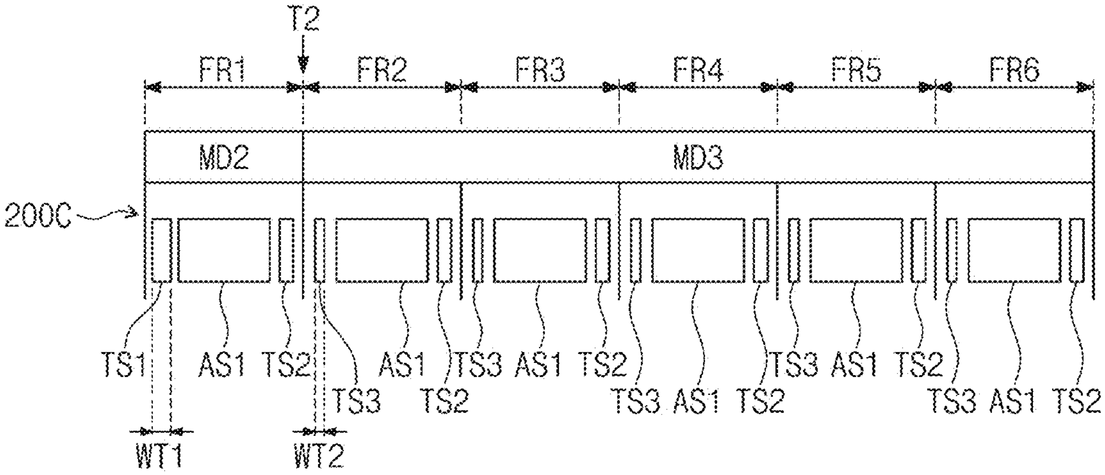
FIG. 13B is a conceptual diagram for describing an operation of a sensor driving unit according to an embodiment of the present disclosure.
Figure 13C:
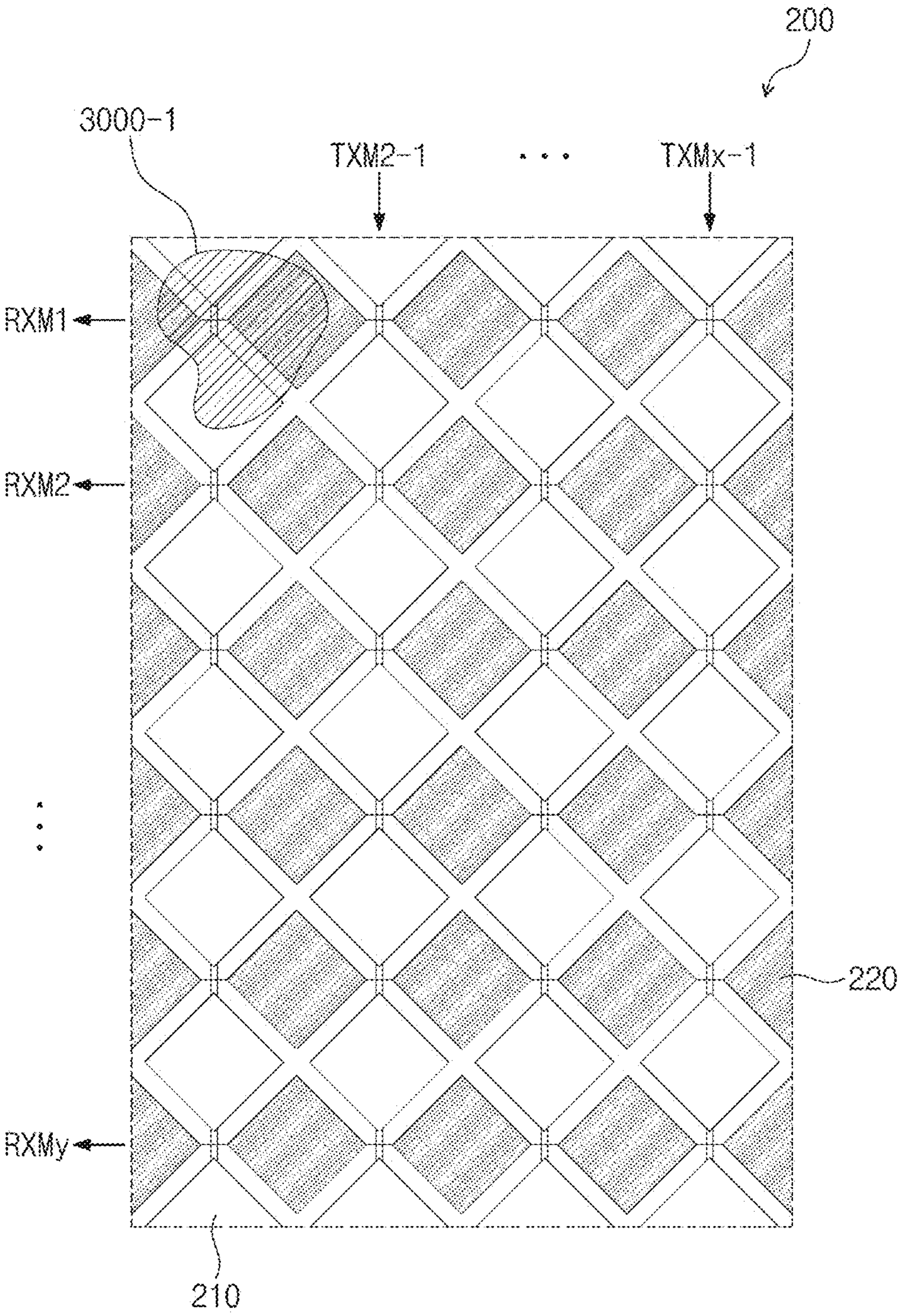
FIG. 13C is a conceptual diagram for describing an operation of a sensor layer according to an embodiment of the present disclosure.

FIG. 13B is a conceptual diagram for describing an operation of a sensor driving unit according to an embodiment of the present disclosure. FIG. 13C is a conceptual diagram for describing an operation of a sensor layer according to an embodiment of the present disclosure. In the description of FIG. 13B, the components that are described with reference to FIG. 9 are marked by the same reference numerals/signs, and thus, for convenience of explanation, additional description will be omitted to avoid redundancy. Also, in the description of FIG. 13C, the components that are described with reference to FIG. 11 are marked by the same reference numerals/signs, and thus, for convenience of explanation, additional description will be omitted to avoid redundancy.

Referring to FIGS. 13B and 13C, in the third mode MD3, the plurality of frame periods FR2, FR3, FR4, FR5, and FR6 may include a third touch section TS3, the first proximity sensing section AS1, and the second touch section TS2. The third touch section TS3 may be a section in which an operation is performed based on the mutual touch method. The third touch section TS3 may refer to a section in which the touch is sensed by transmitting first sensing signals TXM2-1 to TXMx-1 to first electrodes 210 not overlapping a large-area conductor 3000-1 from among the plurality of first electrodes 210, respectively. For example, when the large-area conductor 3000-1 overlaps the first-first electrode, to which the first-first sensing signal is provided, from among the plurality of first electrodes 210, during the third touch section TS3, the sensor driving unit 200C may transmit the first sensing signals TXM2-1 to TXMx-1 only to the remaining first electrodes other than the first-first electrode.

As a time taken to provide the first sensing signals to the first electrodes 210 overlapping the large-area conductor 3000-1 is excluded, a width WT1 of the first touch section TS1 may be greater than a width WT2 of the third touch section TS3.

For example, in the case where 18 first electrodes 210 are included in the sensor layer 200, assuming that 9 first electrodes 210 among the 18 first electrodes 210 overlap a large-area conductor, the width WT2 of the third touch section TS3 may be half the width WT1 of the first touch section TS1. Accordingly, a time taken to transmit the first sensing signals and the number of first sensing signals to be transmitted may decrease.

According to embodiments of the present disclosure, the probability that the touch 2000 (refer to FIG. 2) of the user is provided in an area where the large-area conductor 3000-1 is sensed may be very low. According to embodiments, the first sensing signals that sense the touch 2000 (refer to FIG. 2) of the user is not provided to the area overlapping the large-area conductor 3000-1 during the third touch section TS3. In the third mode MD3, the third touch section TS3 may make it possible to decrease the number of first sensing signals to be transmitted. Accordingly, power consumption of the sensor driving unit 200C may be reduced. That is, the electronic device 1000 (refer to FIG. 1) in which power consumption is reduced may be provided.

Figure 13D:
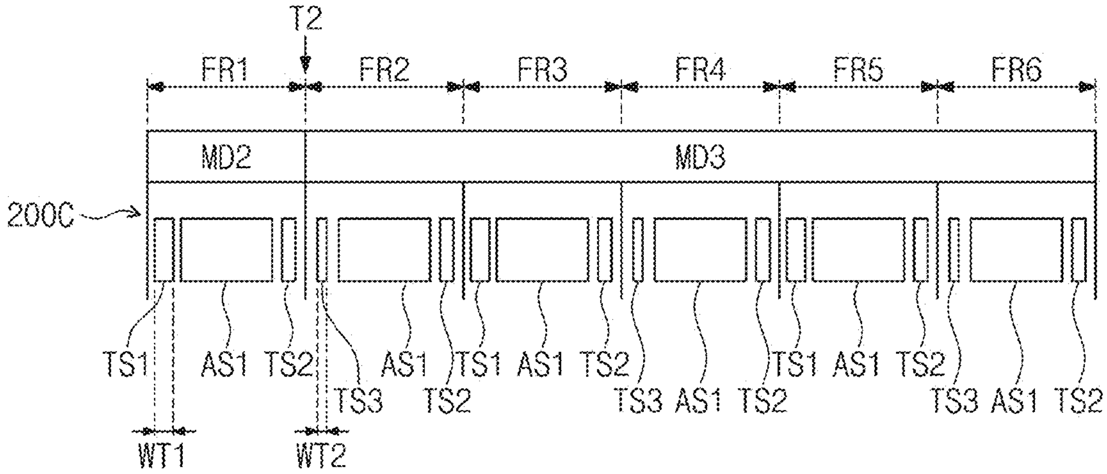
FIG. 13D is a conceptual diagram for describing an operation of a sensor driving unit according to an embodiment of the present disclosure.

FIG. 13D is a conceptual diagram for describing an operation of a sensor driving unit according to an embodiment of the present disclosure. In the description of FIG. 13D, the components that are described with reference to FIG. 13B are marked by the same reference numerals/signs, and thus, for convenience of explanation, additional description will be omitted to avoid redundancy.

Referring to FIGS. 13C and 13D, in the third mode MD3, the first frame periods FR2, FR4, and FR6 and the second frame periods FR3 and FR5 among the plurality of frame periods may be alternately repeated.

Each of the first frame periods FR2, FR4 and FR6 may include the third touch section TS3, the first proximity sensing section AS1, and the second touch section TS2 that are sequentially provided.

Each of the second frame periods FR3 and FR5 may include the first touch section TS1, the first proximity sensing section AS1, and the second touch section TS2 that are sequentially provided.

According to embodiments of the present disclosure, the probability that the touch 2000 (refer to FIG. 2) of the user is provided in an area where the large-area conductor 3000-1 is sensed may be very low. According to embodiments, the first sensing signals that sense the touch 2000 (refer to FIG. 2) of the user are not provided to the area overlapping the large-area conductor 3000-1 during the third touch section TS3. In the third mode MD3, the third touch section TS3 may make it possible to decrease the number of first sensing signals to be transmitted. Accordingly, power consumption of the sensor driving unit 200C may be reduced. That is, the electronic device 1000 (refer to FIG. 1) in which power consumption is reduced may be provided.

Figure 14:
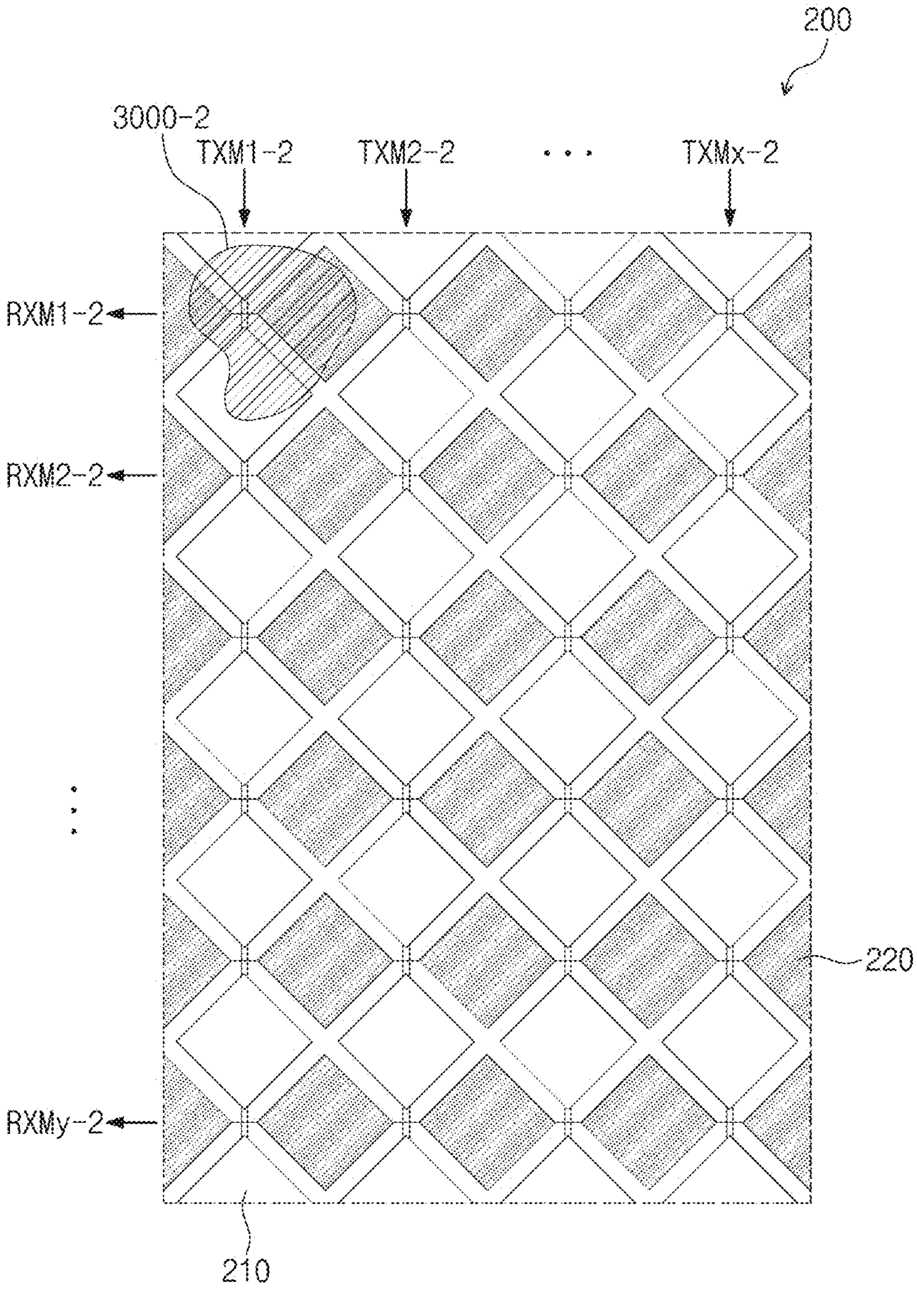
FIG. 14 is a conceptual diagram for describing an operation of a sensor layer according to an embodiment of the present disclosure.

FIG. 14 is a conceptual diagram for describing an operation of a sensor layer according to an embodiment of the present disclosure. In the description of FIG. 14, the components that are described with reference to FIG. 11 are marked by the same reference numerals/signs, and thus, for convenience of explanation, additional description will be omitted to avoid redundancy.

Referring to FIGS. 2 and 14, in the third mode MD3, one frame period among the plurality of frame periods may include the first touch section TS1. In the first touch section TS1 of the third mode MD3, the sensor driving unit 200C may determine a touch only by using the second sensing signal received from at least one second electrode 220, which does not overlap a large-area conductor 3000-2, from among the plurality of second electrodes 220.

For example, when the large-area conductor 3000-2 overlaps the first-second electrode, the sensor driving unit 200C may output a plurality of first sensing signals TXM1-2 and TXM2-2 to TXMx-2 to the plurality of first electrodes 210, respectively. The sensor driving unit 200C may receive a plurality of second sensing signals RXM1-2 and RXM2-2 to RXMy-2 from the plurality of second electrodes 220, respectively, and may ignore the second sensing signal RXM1-2 received from the first-second electrode. That is, according to embodiments, data processing is not performed on the second sensing signal RXM1-2.

Alternatively, in an embodiment, the sensor driving unit 200C does not receive the second sensing signal provided from the first-second electrode of the plurality of second electrodes 220.

According to embodiments of the present disclosure, the probability that the touch 2000 of the user is provided in an area where the large-area conductor 3000-2 is sensed may be very low. With regard to the area overlapping the large-area conductor 3000-2, in embodiments, data processing is not performed for the second sensing signal received to sense the touch 2000 of the user during the first touch section TS1 of the third mode MD3. In the third mode MD3, the data throughput of the sensor driving unit 200C may decrease. In other words, power consumption of the sensor driving unit 200C may be reduced. Accordingly, the electronic device 1000 (refer to FIG. 1) in which power consumption is reduced may be provided.

Figure 15:
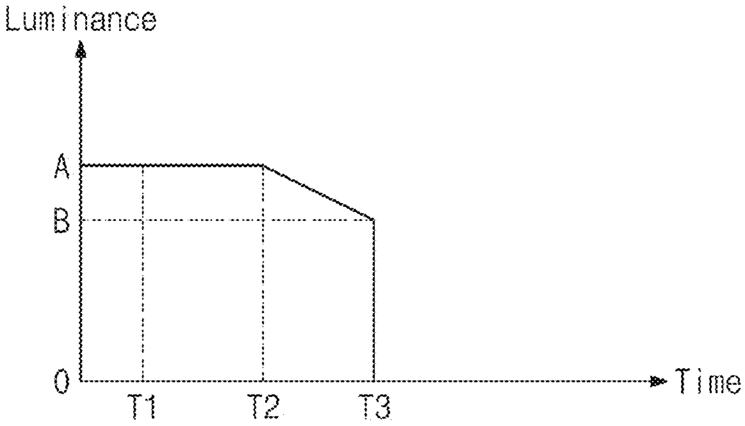
FIG. 15 is a graph illustrating luminance of a display layer according to an embodiment of the present disclosure.

FIG. 15 is a graph illustrating luminance of a display layer according to an embodiment of the present disclosure.

Referring to FIGS. 8 and 15, the display layer 100 may operate in the first display mode DMD1 during a time period from the first time T1 to the second time T2. For example, in the first display mode DMD1, the display layer 100 may emit a light of first luminance "A."

The third mode MD3 may be provided during a time period from the second time T2 to the third time T3. While the sensor driving unit 200C operates in the third mode MD3, the display driving unit 100C may drive the display layer 100 in the second display mode DMD2.

In the second display mode DMD2, the luminance of the display layer 100 may gradually decrease during a plurality of frame periods. For example, in the second display mode DMD2, the luminance of the display layer 100 may gradually decrease from the first luminance "A" to second luminance "B" lower than the first luminance "A."

Unlike embodiments of the present disclosure, the intensity of a proximity signal may be smaller than the intensity of a touch signal. In this case, the proximity signal may be vulnerable to noise of the display layer 100. However, according to embodiments of the present disclosure, the luminance of the display layer 100 may decrease in the third mode MD3. In this case, the noise that is caused in the sensor layer 200 by the display layer 100 may decrease. Accordingly, the proximity signal may be sensed with increased reliability. Also, power consumption of the display layer 100 may be reduced. Accordingly, the electronic device 1000 (refer to FIG. 1) in which power consumption is reduced may be provided.

After the third time T3, the display layer 100 may operate in the third display mode DMD3. In the third display mode DMD3, the display layer 100 may be turned off.

Figure 16:
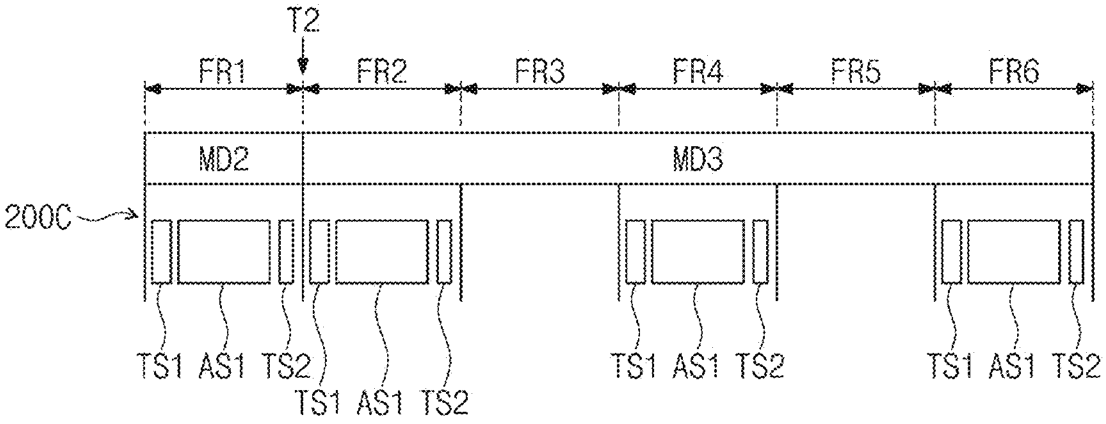
FIG. 16 is a conceptual diagram for describing an operation of a sensor driving unit according to an embodiment of the present disclosure.

FIG. 16 is a conceptual diagram for describing an operation of a sensor driving unit according to an embodiment of the present disclosure. In the description of FIG. 16, the components that are described with reference to FIG. 9 are marked by the same reference numerals/signs, and thus, for convenience of explanation, additional description will be omitted to avoid redundancy.

Referring to FIG. 16, in the third mode MD3, at least one frame period (e.g., FR3 and FR5) among the plurality of frame periods may be a blank period.

In the third mode MD3, first frame periods FR2, FR4, and FR6 and second frame periods FR3 and FR5 among the plurality of frame periods may be alternately repeated.

Each of the first frame periods FR2, FR4 and FR6 may include the first touch section TS1, the first proximity sensing section AS1, and the second touch section TS2 that are sequentially provided. However, this is only an example, and the configuration of the first frame periods FR2, FR4, FR6 according to embodiments of the present disclosure is not limited thereto.

Each of the second frame periods FR3 and FR5 may be a blank period.

In the second frame periods FR3 and FR5 of the third mode MD3, a report rate of the sensor driving unit 200C may decrease to half the operating frequency in the second mode MD2. For example, when the operating frequency in the second mode MD2 is 60 Hz, the operating frequency in the third mode MD3 may be 30 Hz.

According to embodiments of the present disclosure, in the third mode MD3, a time period in which the first sensing signals are provided to the sensor layer 200 may decrease. In other words, power consumption of the sensor driving unit 200C may be reduced. Accordingly, the electronic device 1000 (refer to FIG. 1) in which power consumption is reduced may be provided.

Figure 17:
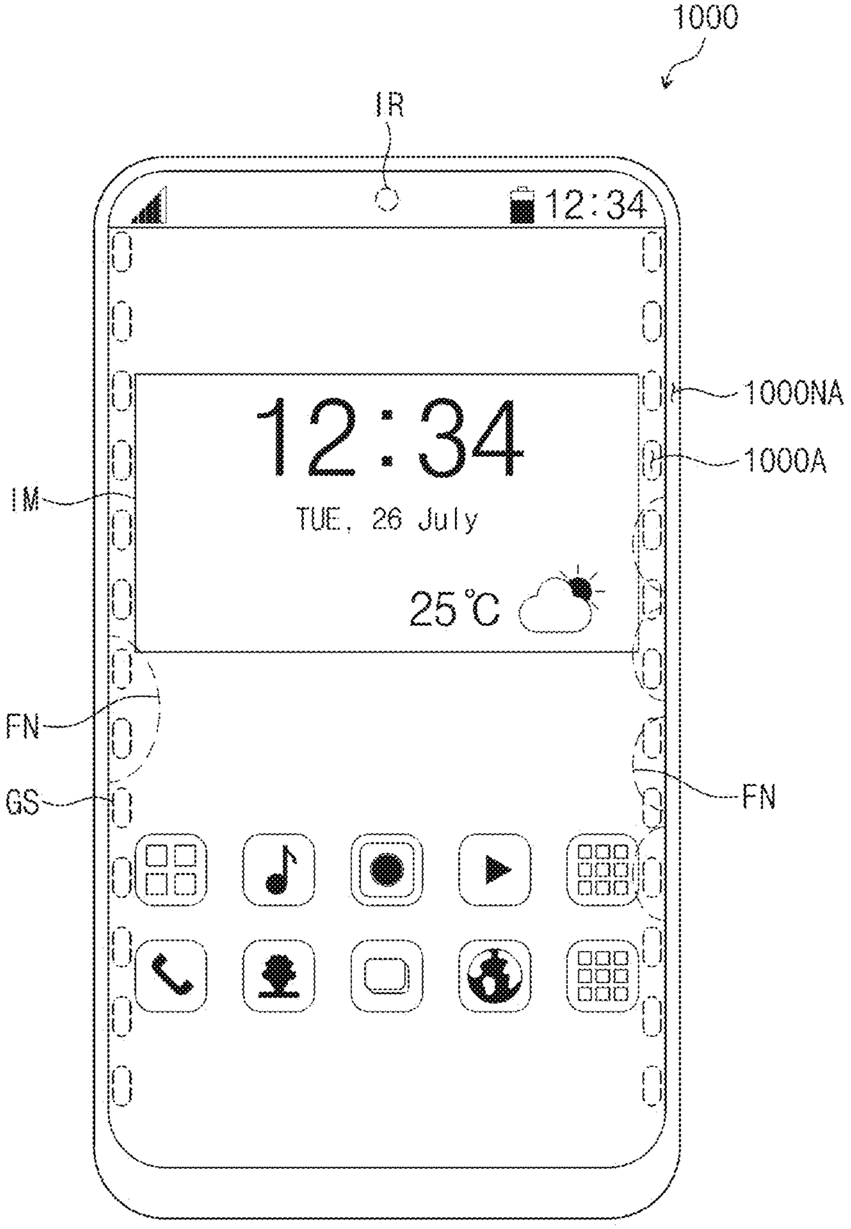
FIG. 17 is a diagram illustrating an electronic device on which a direct touch of a user is made, according to an embodiment of the present disclosure.
Figure 18:
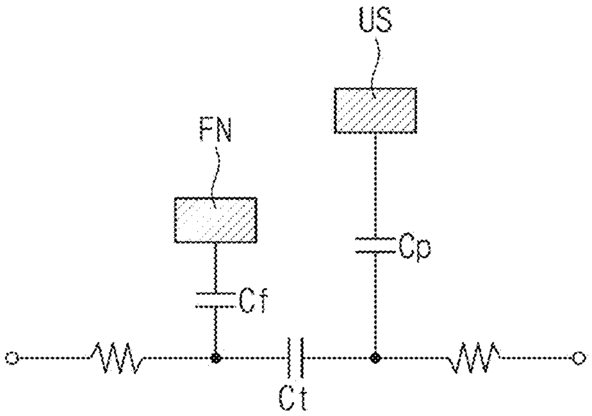
FIG. 18 is a diagram illustrating capacitances when a direct touch is made in a proximity sensing mode.

FIG. 17 is a diagram illustrating an electronic device on which a direct touch of a user is made, according to an embodiment of the present disclosure. FIG. 18 is a diagram illustrating capacitances when a direct touch is made in a proximity sensing mode. In the description of FIG. 17, the components that are described with reference to FIG. 1 are marked by the same reference numerals/signs, and thus, for convenience of explanation, additional description will be omitted to avoid redundancy.

Referring to FIGS. 6, 17, and 18, the electronic device 1000 may further include the gesture sensor GS that senses a first sensing value and the infrared sensor IR that senses a second sensing value different from the first sensing value.

The gesture sensor GS may sense a gesture of the user. For example, when a double tap gesture (a gesture of double-tapping on a surface) is sensed, the sensed gesture may be interpreted as a button press. Alternatively, a gesture of rotating the thumb and the remaining fingers may be interpreted as turning a dial. Alternatively, the gesture sensor GS may sense an object that approaches. The object that approaches may include the large-area conductor 3000 (refer to FIG. 2). The gesture sensor GS may be provided in plural. The plurality of gesture sensors GS may be disposed at a border of the electronic device 1000. The plurality of gesture sensors GS may be disposed in the active area 1000A.

The infrared sensor IR may transmit an infrared light, may receive a light reflected by the object, and may calculate a distance between the electronic device 1000 and the object based on the intensity of the reflected light. The object may include the large-area conductor 3000 (refer to FIG. 2).

The image IM generated in the display layer 100 may be provided to the user through the active area 1000A of the electronic device 1000.

When the first transmit signals DS1 or the second transmit signals DS2 are applied to the first electrodes 210 of the sensor layer 200, a first capacitance Ct may be formed between the second electrodes 220 and the first electrodes 210.

After the call mode, when the ear, denoted in the figures as US, of the user comes close to the sensor layer 200, a second capacitance Cp may be formed between the ear US of the user and the sensor layer 200. The first capacitance Ct may change due to the second capacitance Cp, and the variation in the first capacitance Ct may be sensed. In this case, a proximity state of the ear US of the user may be sensed. The ear US of the user may mean the large-area conductor 3000 (refer to FIG. 2).

After the call mode, the user may directly touch the sensor layer 200. For example, the user may hold the border of the electronic device 1000 and may make a call. Fingers FN of the user may touch the inside of the electronic device 1000 and may touch the active area 1000A adjacent to the border of the electronic device 1000. The fingers FN of the user may mean the touch 2000 (refer to FIG. 2) of the user.

When the direct touch of the user is made, a third capacitance Cf may be formed between the fingers FN of the user and the sensor layer 200. The first capacitance Ct and the second capacitance Cp may change due to the third capacitance Cf. In this case, the proximity state of the ear US of the user may not be normally sensed due to the third capacitance Cf. However, according to embodiments of the present disclosure, when the sensor layer 200 senses a touch in the second mode MD2 (refer to FIG. 20), the sensor driving unit 200C (refer to FIG. 2) may switch from the second mode MD2 (refer to FIG. 20) to the fourth mode MD4 (refer to FIG. 20) and may drive the sensor layer 200. When the touch 2000 is maintained in the fourth mode MD4 (refer to FIG. 20), the sensor driving unit 200C may drive the sensor layer 200 in the first sub-mode SMD1 (refer to FIG. 20). The first sub-mode SMD1 (refer to FIG. 20) may refer to a mode in which the influence of the third capacitance Cf is minimized or reduced such that the proximity state of the ear US of the user is easily sensed. This will be described in further detail below.

Figure 19:
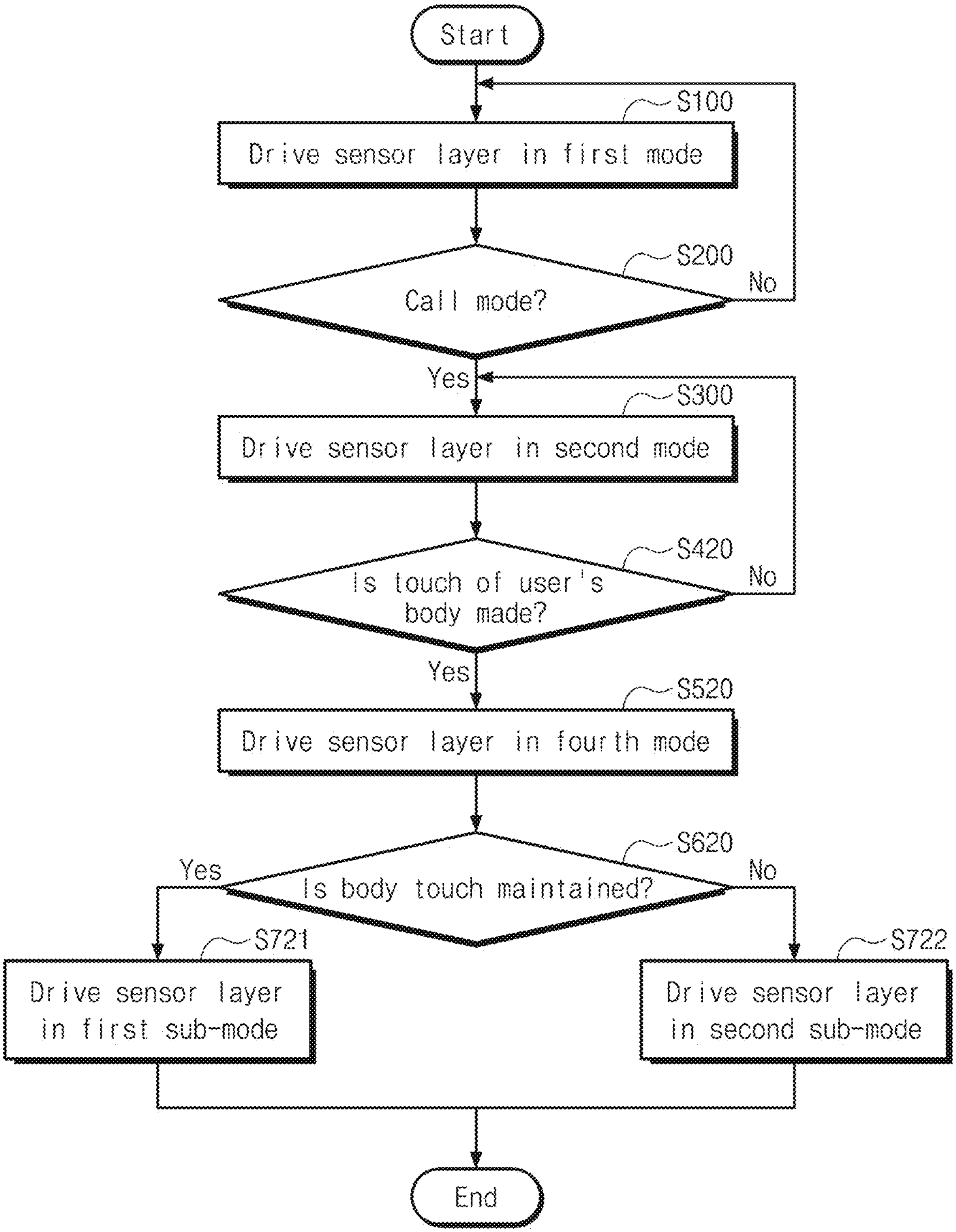
FIG. 19 is a flowchart illustrating a driving method of an electronic device, according to an embodiment of the present disclosure.
Figure 20:
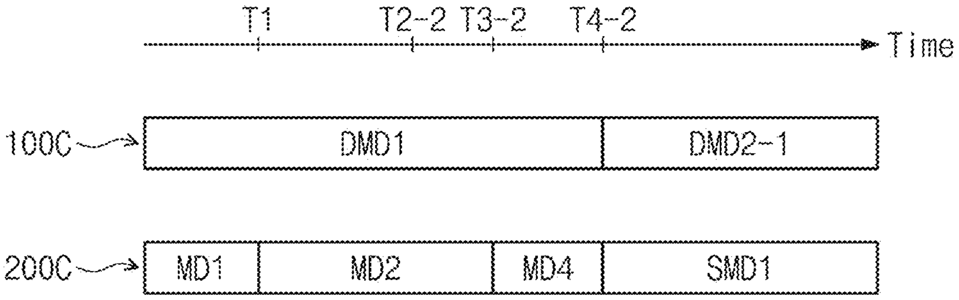
FIG. 20 is a diagram illustrating driving of an electronic device according to an embodiment of the present disclosure.

FIG. 19 is a flowchart illustrating a driving method of an electronic device according to an embodiment of the present disclosure. FIG. 20 is a diagram illustrating driving of an electronic device according to an embodiment of the present disclosure. In the description of FIG. 19, the components that are described with reference to FIG. 7 are marked by the same reference numerals/signs, and thus, for convenience of explanation, additional description will be omitted to avoid redundancy. In the description of FIG. 20, the components that are described with reference to FIG. 8 are marked by the same reference numerals/signs, and thus, for convenience of explanation, additional description will be omitted to avoid redundancy.

Referring to FIGS. 2, 19, and 20, the sensor driving unit 200C may further drive the sensor layer 200 in the fourth mode MD4, the first sub-mode SMD1, and the second sub-mode.

When the sensor layer 200 senses the touch 2000 of the user in the fourth mode MD4 (S420), the sensor driving unit 200C may drive the sensor layer 200 in the fourth mode MD4 (S520). The fourth mode MD4 may be referred to as a "finger touch mode." A time when the touch 2000 is provided to the sensor layer 200 may be defined as a (2-2)-th time T2-2, and a time when the sensor layer 200 senses the touch 2000 may be defined as a (3-2)-th time T3-2.

The sensor driving unit 200C may determine whether the touch 2000 of the body is maintained (S620).

When the touch 2000 is sensed and maintained for a predetermined time, the sensor driving unit 200C may operate in the first sub-mode SMD1 (S721). In this case, a time when the sensor driving unit 200C starts to operate in the first sub-mode SMD1 may be defined as a (4-2)-th time T4-2.

When the touch 2000 is sensed and maintained for a predetermined time, the sensor driving unit 200C may determine the touch 2000 as an unintended touch. For example, the unintended touch may be a touch that is made due to a grip such as the fingers FN of the user (refer to FIG. 17). The predetermined time may be defined as the given number of frame periods.

While the sensor driving unit 200C operates in the first sub-mode SMD1, the main driving unit 1000C may ignore the touch 2000. Assuming that the sensor driving unit 200C operates in the first sub-mode SMD1, in the case where a change in the coordinates of the touch 2000 calculated based on the coordinate signal I-SS while the touch 2000 is sensed during the predetermined time is small, the main driving unit 1000C may ignore the coordinate signal I-SS received from the sensor driving unit 200C. That is, the change in the coordinates of the touch 2000 being small may mean that the coordinates of the touch 2000 are maintained at a specific location.

According to embodiments of the present disclosure, when it is determined that the touch 2000 is not an intended touch of the user, the main driving unit 1000C may ignore the touch 2000. Accordingly, the electronic device 1000 having increased reliability may be provided.

Each of the plurality of frame periods in the first sub-mode SMD1 may be identical to each of the plurality of frame periods in the second mode MD2. For example, each of the plurality of frame periods in the first sub-mode SMD1 may include the first touch section TS1 (refer to FIG. 9), the first proximity sensing section AS1 (refer to FIG. 9), and the second touch section TS2 (refer to FIG. 9).

When the touch 2000 is sensed during a time shorter than the predetermined time (e.g., when the touch 2000 is not maintained for the predetermined time), the sensor driving unit 200C may operate in the second sub-mode (S722).

In the second sub-mode, the sensor driving unit 200C may determine coordinates of a touch based on the plurality of first touch sections TS1 (refer to FIG. 21) and the plurality of second touch sections TS2 (refer to FIG. 21) in the fourth mode MD4. Each of the plurality of frame periods in the second sub-mode may be identical to each of the plurality of frame periods in the fourth mode MD4.

TABLE 1

| | First sub-mode | Second sub-mode |
|---|---|---|
| First sensing value | AA | AA' |
| Second sensing value | BB | BB' |
| Third sensing value | CC | CC' |

Table 1 above shows weights that are applied to sensing values that the electronic device 1000 uses to sense a proximity state. Referring to Table 1 above, the gesture sensor GS (refer to FIG. 17) may sense the first sensing value. The infrared sensor IR (refer to FIG. 17) may sense the second sensing value. The sensor layer 200 may sense the third sensing value. The third sensing value may be included in the proximity sensing signal I-NS.

The main driving unit 1000C may receive the first to third sensing values. The main driving unit 1000C may determine the proximity state for the large-area conductor 3000 by applying given weights to the first to third sensing values, respectively.

The first weight AA that is applied to the first sensing value while the sensor driving unit 200C operates in the first sub-mode SMD1 may be greater than the first weight AA' that is applied to the first sensing value while the sensor driving unit 200C operates in the second sub-mode.

The second weight BB that is applied to the second sensing value while the sensor driving unit 200C operates in the first sub-mode SMD1 may be greater than the second weight BB' that is applied to the second sensing value while the sensor driving unit 200C operates in the second sub-mode.

The third weight CC that is applied to the third sensing value while the sensor driving unit 200C operates in the first sub-mode SMD1 may be smaller than the third weight CC' that is applied to the third sensing value while the sensor driving unit 200C operates in the second sub-mode.

Unlike embodiments of the present disclosure, in the call mode, the sensor driving unit 200C may operate in the proximity sensing mode to sense the user's face or ear. The user may hold the border of the electronic device 1000 and may make a call. When the direct touch of the user is made, the third capacitance Cf (refer to FIG. 18) may be formed between the user's finger(s) and the sensor layer 200. The first capacitance Ct (refer to FIG. 18) and the second capacitance Cp (refer to FIG. 18) may change due to the third capacitance Cf (refer to FIG. 18). In this case, the reliability for the determination of the proximity state of the user using the sensing value sensed in the sensor layer 200 may decrease due to the third capacitance Cf (refer to FIG. 18).

In contrast, according to embodiments of the present disclosure, when the touch 2000 of the user is determined as an unintended touch, the main driving unit 1000C may determine the proximity state of the large-area conductor 3000 after decreasing the weight for the proximity-based sensing value sensed by the sensor layer 200 and increasing the weights for the proximity-based sensing values sensed by the gesture sensor GS (refer to FIG. 17) and the infrared sensor IR (refer to FIG. 17). Thus, the accuracy of proximity determination of the main driving unit 1000C may be increased. Accordingly, the electronic device 1000 with increased reliability may be provided.

However, this is only an example, and a sensor that senses a proximity state according to embodiments of the present disclosure is not limited thereto. For example, the electronic device 1000 may further include a gyro sensor or an acceleration sensor, and the main driving unit 1000C may further use a fourth sensing value sensed by the gyro sensor or the acceleration sensor to determine the proximity state. In this case, a fourth weight that that is applied to the fourth sensing value while the sensor driving unit 200C operates in the first sub-mode SMD1 may be greater than a fourth weight that is applied to the fourth sensing value while the sensor driving unit 200C operates in the second sub-mode.

The display driving unit 100C may drive the display layer 100 in the first display mode DMD1. In the first display mode DMD1, the display layer 100 may emit a light of predetermined luminance.

After the (4-2)-th time T4-2 when the sensor driving unit 200C starts to operate in the first sub-mode SMD1, the display layer 100 may operate in a (2-1)-th display mode DMD2-1. The (2-1)-th display mode DMD2-1 may be a mode different from the first display mode DMD1. This will be described in further detail below.

Figure 21:
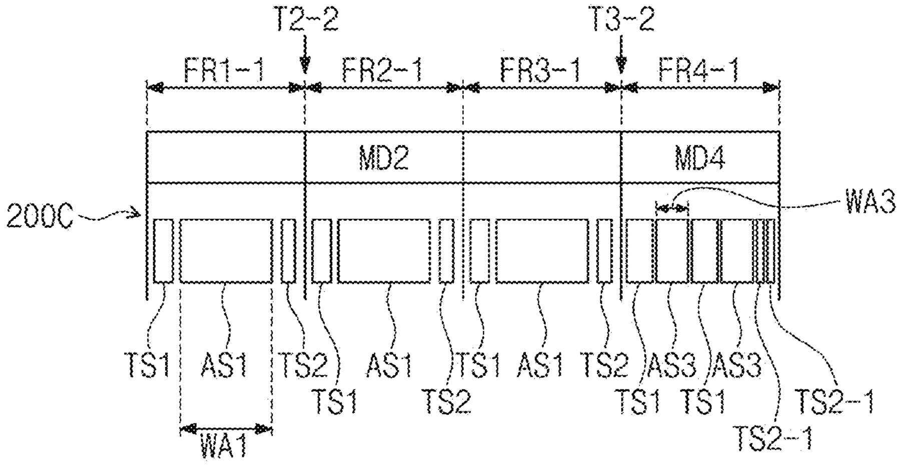
FIG. 21 is a conceptual diagram for describing an operation of a sensor driving unit according to an embodiment of the present disclosure.

FIG. 21 is a conceptual diagram for describing an operation of a sensor driving unit according to an embodiment of the present disclosure. In the description of FIG. 21, the components that are described with reference to FIG. 9 are marked by the same reference numerals/signs, and thus, for convenience of explanation, additional description will be omitted to avoid redundancy.

Referring to FIGS. 2 and 21, one frame period FR1-1 among the plurality of frame periods in the second mode MD2 may include the first touch section TS1, the first proximity sensing section AS1, and the second touch section TS2 that are sequentially provided.

Just after the (2-2)-th time T2-2, during the frame period FR2-1, the touch 2000 of the user may be provided from outside of the electronic device 1000.

In a frame period FR3-1 following the frame period FR2-1 in which the touch 2000 of the user is provided, the touch 2000 of the user may be sensed in the first touch section TS1 and the second touch section TS2.

After a (3-2)-th time T3-2, the sensor driving unit 200C may operate in the fourth mode MD4. That is, when the sensor layer 200 senses a touch during any one frame period FR3-1 in the second mode MD2, the sensor driving unit 200C may operate in the fourth mode MD4 in a next frame period FR4-1.

One frame period FR4-1 among the plurality of frame periods in the fourth mode MD4 may include a plurality of first touch sections TS1, a plurality of third proximity sensing sections AS3, and a plurality of second touch sections TS2-1.

During the frame period FR4-1 in the fourth mode MD4, the first touch section TS1, the third proximity sensing section AS3, the first touch section TS1, the third proximity sensing section AS3, the second touch section TS2, and the second touch section TS2 may be sequentially provided.

A width WA3 of the third proximity sensing section AS3 may be smaller than the width WA1 of the first proximity sensing section AS1. As such, during one frame period FR4-1 in the fourth mode MD4, the first touch section TS1 or the second touch section TS2 may be provided in plural.

As such, during one frame period FR4-1 in the fourth mode MD4, two first touch sections TS1 and two second touch sections TS2 may be included.

According to embodiments of the present disclosure, in the fourth mode MD4 that is executed when the touch 2000 is provided, the report rate of touch sections that sense the touch 2000 of the user may be increased two times compared to the second mode MD2. That is, while operating in the fourth mode MD4, the sensor layer 200 and the sensor driving unit 200C may easily sense the touch 2000. Thus, performance of touch sensing in the call mode may be secured. Accordingly, the electronic device 1000 with increased sensing reliability may be provided.

Figure 22:
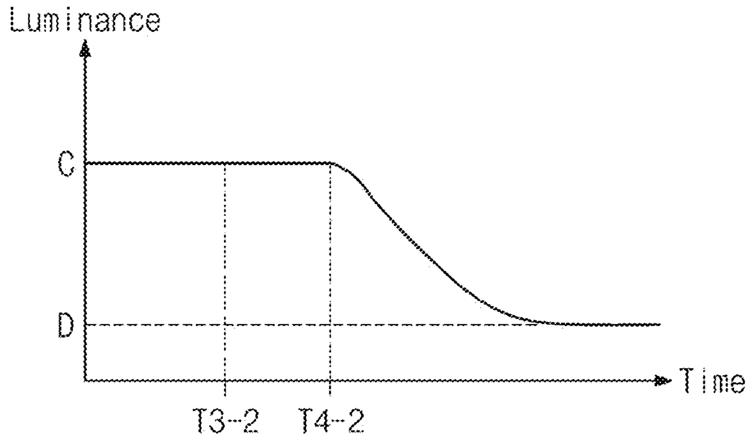
FIG. 22 is a graph illustrating luminance of a display layer according to an embodiment of the present disclosure.

FIG. 22 is a graph illustrating luminance of a display layer according to an embodiment of the present disclosure.

Referring to FIGS. 20 and 22, the display layer 100 may operate in the first display mode DMD1 during the first mode MD1, the second mode MD2, and the fourth mode MD4. For example, in the first display mode DMD1, the display layer 100 may emit a light of third luminance “C.” However, this is only an example, and the luminance of the display layer 100 in the first display mode DMD1 according to an embodiment of the present disclosure is not limited thereto. For example, in the first display mode DMD1, the display layer 100 may emit a light of the first luminance "A" like the example of FIG. 15.

While operating in the first sub-mode SMD1, the display driving unit 100C may drive the display layer 100 in the (2-1)-th display mode DMD2-1.

In the (2-1)-th display mode DMD2-1, the luminance of the display layer 100 may gradually decrease during a plurality of frame periods. For example, in the (2-1)-th display mode DMD2-1, the luminance of the display layer 100 may gradually decrease from the third luminance "C" to a fourth luminance "D" lower than the third luminance "C."

A slope at which luminance decreases when the image IM (refer to FIG. 17) generated in the display layer 100 is a moving image may be greater than a slope at which luminance decreases when the image IM is a still image.

According to embodiments of the present disclosure, the luminance of the display layer 100 may decrease in the first sub-mode SMD1. In this case, the amount of noise introduced from the display layer 100 to the sensor layer 200 may decrease. As a result, the proximity sensing capability may be improved during the first sub-mode SMD1. Accordingly, the electronic device 1000 (refer to FIG. 1) with improved sensing reliability may be provided.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

According to the above description, in a third mode, a time period in which first sensing signals are provided to a sensor layer may decrease. As a result, power consumption of a sensor driving unit may be reduced. Accordingly, an electronic device in which power consumption is reduced may be provided.

Also, according to the above description, when a touch of the user is determined as an unintended touch, a main driving unit may determine a proximity state of a large-area conductor after decreasing a weight for a proximity-based sensing value sensed by the sensor layer and increasing weights for proximity-based sensing values sensed by a gesture sensor and an infrared sensor. As a result, the accuracy of proximity determination of the main driving unit may be increased. Accordingly, an electronic device with increased sensing reliability may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of driving an electronic device comprising:

when a user makes a call, a sensor driving unit drives a sensor layer from a first mode to a second mode different from the first mode;

when the sensor layer senses an external input in the second mode, the sensor driving unit drives the sensor layer from the second mode to a third mode different from the second mode; and, when a main driving unit driving the sensor driving unit determines a proximity state in the third mode, the sensor driving unit drives the sensor layer from the third mode to the second mode, wherein, in the second mode, each frame period among a plurality of frame periods comprises:

a first touch section in which a touch of the user is sensed in a mutual touch method;

a first proximity sensing section of a first width in which the proximity state of a large-area conductor is sensed in a self-capacitance method; and a second touch section in which the touch is sensed in a self-touch method, wherein, in the third mode, a first frame period among the plurality of frame periods comprises:

a second proximity sensing section of a second width different from the first width of the first proximity sensing section in which the proximity state of a large-area conductor is sensed in the self-capacitance method; and one of i) the first touch section or (ii) the second touch section, and a second frame period among the plurality of frame periods comprises:

the first touch section;

the first proximity sensing section; and the second touch section, and wherein the first frame period and the second frame period are alternately repeated in the third mode.

2. The method of driving the electronic device of claim 1, wherein, in the second mode, the sensor driving unit provides the main driving unit with a first proximity sensing signal sensed in the first proximity sensing section, and the main driving unit provides the sensor driving unit with a first proximity determination signal generated based on the first proximity sensing signal.

3. The method of driving the electronic device of claim 2, wherein, in the third mode, the sensor driving unit provides the main driving unit with a second proximity sensing signal sensed in the second proximity sensing section, and the main driving unit does not provide the sensor driving unit with a second proximity determination signal generated based on the second proximity sensing signal.

4. The method of driving the electronic device of claim 1, wherein a period of the second proximity sensing section is longer than a period of the first proximity sensing section, and wherein a frequency of the second proximity sensing section is shorter than a frequency of the first proximity sensing section.

5. The method of driving the electronic device of claim 1, wherein the sensor layer comprises a plurality of first electrodes and a plurality of second electrodes intersecting with the plurality of first electrodes, wherein, in the second mode, the sensor driving unit receives a sensing signal from each of the plurality of second electrodes and determines the touch.

6. The method of driving the electronic device of claim 5, wherein, in the third mode, the sensor driving unit determines the touch only by using the sensing signal received from at least one second electrode not overlapping the large-area conductor from among the plurality of second electrodes.

7. The method of driving the electronic device of claim 1, wherein a display driving unit drives a display layer in a first display mode during the third mode, and wherein, in the first display mode, a luminance of the display layer gradually decreases during the plurality of frame periods.

8. The method of driving the electronic device of claim 1, wherein, in the third mode, another frame period among the plurality of frame periods is provided after the first frame period and is a blank period.

9. The method of driving the electronic device of claim 1, further comprising:

when the sensor layer senses the touch, the sensor driving unit drives the sensor layer in a fourth mode; and when the touch is sensed for at least a predetermined time in the fourth mode, the sensor driving unit operates in a first sub-mode, and when the touch is sensed during a time shorter than the predetermined time in the fourth mode, the sensor driving unit operates in a second sub-mode, wherein, in the fourth mode, one frame period among the plurality of frame periods comprises:

a plurality of first touch sections, wherein the first touch section is one of the plurality of first touch sections;

a second proximity sensing section shorter than the first proximity sensing section; and a plurality of second touch sections, wherein the second touch section is one of the plurality of second touch sections.

10. The method of driving the electronic device of claim 9, wherein the main driving unit ignores the touch while the sensor driving unit operates in the first sub-mode.

11. The method of driving the electronic device of claim 9, wherein a weight applied to each of a first sensing value sensed by a gesture sensor and a second sensing value sensed by an infrared sensor in the first sub-mode is greater than a weight applied to each of the first sensing value and the second sensing value in the second sub-mode, and wherein a weight applied to a third sensing value sensed by the sensor layer in the first sub-mode is smaller than a weight applied to the third sensing value in the second sub-mode.

12. A method of driving an electronic device, comprising:

when a user makes a call, a sensor driving unit drives a sensor layer from a first mode to a second mode different from the first mode;

when the sensor layer senses an external input in the second mode, the sensor driving unit drives the sensor layer from the second mode to a third mode different from the second mode; and when a touch of the user is sensed for at least a predetermined time in the third mode, the sensor driving unit operates in a first sub-mode and when the touch is sensed for a time shorter than the predetermined time in a fourth mode, the sensor driving unit operates in a second sub-mode, wherein, in the second mode, one frame period among a plurality of frame periods comprises:

a first touch section in which the touch is sensed in a mutual touch method;

a first proximity sensing section in which a proximity state of a large-area conductor is sensed; and a second touch section in which the touch is sensed in a self-touch method, wherein, in the third mode, one frame period among the plurality of frame periods comprises:

a plurality of first touch sections, wherein the first touch section is one of the plurality of first touch sections;

a second proximity sensing section shorter than the first proximity sensing section; and a plurality of second touch sections, wherein the second touch section is one of the plurality of second touch sections, wherein a weight applied to each of a first sensing value sensed by a gesture sensor and a second sensing value sensed by an infrared sensor in the first sub-mode is greater than a weight applied to each of the first sensing value and the second sensing value in the second sub-mode, and wherein a weight applied to a third sensing value sensed by the sensor layer in the first sub-mode is smaller than a weight applied to the third sensing value in the second sub-mode.

13. The method of driving the electronic device of claim 12, wherein a main driving unit ignores the touch while the sensor driving unit operates in the first sub-mode.

14. The method of driving the electronic device of claim 13, further comprising:

when the sensor layer senses the proximity state in the second mode, the sensor driving unit drives the sensor layer from the second mode to a fourth mode, and wherein, in the fourth mode, one frame period among the plurality of frame periods comprises:

a third proximity sensing section different from the first proximity sensing section; and the first touch section or the second touch section.

15. The method of driving the electronic device of claim 14, wherein, in the second mode, the sensor driving unit provides the main driving unit with a first proximity sensing signal sensed in the first proximity sensing section, and the main driving unit provides the sensor driving unit with a first proximity determination signal generated based on the first proximity sensing signal.

16. The method of driving the electronic device of claim 15, wherein, in the fourth mode, the sensor driving unit provides the main driving unit with a third proximity sensing signal sensed in the third proximity sensing section, and the main driving unit does not provide the sensor driving unit with a third proximity determination signal generated based on the third proximity sensing signal.

17. The method of driving the electronic device of claim 14, wherein a period of the third proximity sensing section is longer than a period of the first proximity sensing section, and wherein a frequency of the third proximity sensing section is shorter than a frequency of the first proximity sensing section.

18. The method of driving the electronic device of claim 14, wherein the sensor layer comprises a plurality of first electrodes and a plurality of second electrodes intersecting with the plurality of first electrodes, wherein, in the second mode, the sensor driving unit receives a sensing signal from each of the plurality of second electrodes and determines the touch, and wherein, in the third mode, the sensor driving unit determines the touch only by using the sensing signal received from at least one second electrode not overlapping the large-area conductor from among the plurality of second electrodes.

19. The method of driving the electronic device of claim 14, wherein, in the fourth mode, another frame period among the plurality of frame periods is provided after the one frame period and is a blank period.

20. The method of driving the electronic device of claim 12, wherein a display driving unit drives a display layer in a first display mode during the first sub-mode, and wherein, in the first display mode, a luminance of the display layer gradually decreases during the plurality of frame periods.

* * * * *